US011391458B2

(12) United States Patent
Evans et al.

(10) Patent No.: US 11,391,458 B2
(45) Date of Patent: Jul. 19, 2022

(54) THERMAL OXIDIZATION SYSTEMS AND METHODS

(71) Applicant: COMBUSTION SYSTEMS COMPANY, INC., Indianapolis, IN (US)

(72) Inventors: Patrick Ross Evans, Monrovia, IN (US); David Elliott Johnson, Jr., Indianapolis, IN (US); Thomas Darrell Evans, Avon, IN (US); James David Hailey, Richmond, TX (US)

(73) Assignee: Combustion Systems Company, Inc., Indianapolis, IN (US)

( * ) Notice: Subject to any disclaimer, the term of this patent is extended or adjusted under 35 U.S.C. 154(b) by 500 days.

(21) Appl. No.: 16/313,368

(22) PCT Filed: Jun. 27, 2017

(86) PCT No.: PCT/US2017/039575
§ 371 (c)(1),
(2) Date: Dec. 26, 2018

(87) PCT Pub. No.: WO2018/005545
PCT Pub. Date: Jan. 4, 2018

(65) Prior Publication Data
US 2019/0316773 A1 Oct. 17, 2019

Related U.S. Application Data

(60) Provisional application No. 62/354,991, filed on Jun. 27, 2016.

(51) Int. Cl.
F23G 7/06 (2006.01)
F23D 14/62 (2006.01)
(Continued)

(52) U.S. Cl.
CPC ............. *F23G 7/063* (2013.01); *F23D 14/62* (2013.01); *F23N 5/102* (2013.01);
(Continued)

(58) Field of Classification Search
CPC ............... F23G 7/063; F23G 2202/101; F23G 2207/101; F23D 14/62; F23N 5/102; B01D 2257/708
See application file for complete search history.

(56) References Cited

U.S. PATENT DOCUMENTS 2,121,733 A * 6/1938 Cottrell ................. B01D 53/34
423/210
3,658,482 A * 4/1972 Evans ..................... F23G 7/065
422/114
(Continued)

OTHER PUBLICATIONS

International Search Report and Written Opinion dated Sep. 6, 2017, for International Application No. PCT/US207/39575, 17 pages.

Primary Examiner — Vivek K Shirsat
(74) Attorney, Agent, or Firm — Frost Brown Todd LLP

(57) ABSTRACT

A thermal oxidizer (50) employing an oxidation mixer (51), an oxidation chamber (52), a retention chamber (53) and a heat dissipater (54) forming a fluid flow path for thermal oxidation of a waste gas. In operation, the oxidation mixer (51) facilitates a combustible mixture of the waste gas and an oxidant into an combustible waste gas stream. A heating element (55) of the oxidation chamber (52) facilitates a primary combustion reaction of the combustible waste gas stream into an oxygenated waste gas stream. The retention chamber (53) facilitates a secondary combustion reaction of the oxygenated waste gas stream into oxidized gases. The heat dissipater (54) atmospherically vents of the oxidized gases. An oxidization controller (61) may be employed to regulate the operation of the thermal oxidizer (50), and a data logger (63) and a data reporter (65) may be employed
(Continued)

for respectively logging and remotely reporting a regulation of the thermal oxidizer (50) by the oxidation controller (61).

14 Claims, 16 Drawing Sheets

(51) Int. Cl.
*F23N 5/10* (2006.01)
*F23D 14/20* (2006.01)

(52) U.S. Cl.
CPC ........ *B01D 2257/708* (2013.01); *F23D 14/20* (2013.01); *F23D 2208/10* (2013.01); *F23G 2202/101* (2013.01); *F23G 2207/101* (2013.01)

(56) References Cited

U.S. PATENT DOCUMENTS

| | | | | |
|---|---|---|---|---|
| 3,870,474 A * | 3/1975 | Houston | ............ | B01D 53/70 422/171 |
| 3,895,918 A * | 7/1975 | Mueller | ............ | F23G 7/068 422/175 |
| 3,914,088 A * | 10/1975 | Huyck | ............ | F23G 5/50 431/5 |
| 4,025,324 A * | 5/1977 | Stackhouse, Jr. | .. | B01D 53/0446 96/111 |
| 4,135,885 A * | 1/1979 | Wormser | ............ | B01J 8/28 201/17 |
| 4,332,206 A * | 6/1982 | Tucker | ............ | F23G 5/16 110/203 |
| 4,358,268 A * | 11/1982 | Neville | ............ | F27D 17/004 432/180 |
| 4,454,826 A * | 6/1984 | Benedick | ............ | F28D 17/005 110/211 |
| 4,688,495 A * | 8/1987 | Galloway | ............ | F23G 5/008 110/236 |
| 4,793,974 A * | 12/1988 | Hebrank | ............ | F23G 7/068 110/211 |
| 4,819,571 A * | 4/1989 | Hallett | ............ | A62D 3/37 110/214 |
| 4,878,839 A * | 11/1989 | Wunning | ............ | F23G 7/065 432/72 |
| 4,976,611 A * | 12/1990 | Knop | ............ | F23L 15/02 432/181 |
| 4,983,362 A * | 1/1991 | Obermuller | ............ | F23G 7/066 422/109 |
| 5,026,277 A * | 6/1991 | York | ............ | F23G 7/068 110/212 |
| 5,098,286 A * | 3/1992 | York | ............ | F23G 7/068 110/211 |
| 5,129,332 A * | 7/1992 | Greco | ............ | F23G 7/068 110/233 |
| 5,163,829 A * | 11/1992 | Wildenberg | ............ | F23G 7/068 110/211 |
| 5,184,951 A * | 2/1993 | Nutcher | ............ | F23D 14/26 432/180 |
| 5,259,757 A | 11/1993 | Plejdrup et al. | | |
| 5,262,131 A * | 11/1993 | Bayer | ............ | F01N 13/0097 422/175 |
| 5,286,459 A * | 2/1994 | Krismanth | ............ | F23G 7/066 110/210 |
| 5,352,115 A * | 10/1994 | Klobucar | ............ | F23G 7/068 110/211 |
| 5,453,259 A * | 9/1995 | D'Souza | ............ | F23G 7/068 423/245.1 |
| 5,531,593 A * | 7/1996 | Klobucar | ............ | F23G 7/068 110/211 |
| 5,533,890 A | 7/1996 | Holst et al. | | |
| 5,578,276 A * | 11/1996 | Klobucar | ............ | F23G 7/068 422/173 |
| 5,612,005 A * | 3/1997 | Garvey | ............ | F23G 7/068 422/170 |
| 5,620,668 A * | 4/1997 | Driscoll | ............ | F23G 7/068 422/175 |
| 5,657,706 A * | 8/1997 | Liagre | ............ | C03B 3/02 110/250 |
| 5,770,784 A * | 6/1998 | Heywood | ............ | F23G 7/063 588/311 |
| 5,800,792 A * | 9/1998 | Ibaraki | ............ | B01D 53/46 422/109 |
| 5,871,349 A | 2/1999 | Johnson et al. | | |
| 5,888,063 A * | 3/1999 | Scott | ............ | F23G 7/068 432/181 |
| 5,941,184 A * | 8/1999 | Casacia | ............ | F23L 9/02 110/346 |
| 5,989,010 A * | 11/1999 | Martin | ............ | F23C 99/006 431/7 |
| 6,015,540 A * | 1/2000 | McAdams | ............ | F23C 99/006 423/659 |
| 6,019,597 A | 2/2000 | Martin et al. | | |
| 6,228,329 B1 * | 5/2001 | Garvey | ............ | F23G 7/068 422/171 |
| 6,257,869 B1 * | 7/2001 | Martin | ............ | F23C 99/006 431/7 |
| 6,321,462 B1 * | 11/2001 | Seidl | ............ | F23C 9/06 34/423 |
| 6,622,780 B1 * | 9/2003 | Potzl | ............ | F23G 7/068 165/10 |
| 6,857,379 B2 * | 2/2005 | Gross | ............ | F23G 7/12 110/346 |
| 7,017,592 B2 * | 3/2006 | Chiles | ............ | F23G 7/068 134/22.1 |
| 7,033,544 B2 * | 4/2006 | Tesar | ............ | F23G 7/068 422/111 |
| 7,494,625 B2 * | 2/2009 | Abrams | ............ | B01D 53/90 422/129 |
| 7,507,084 B2 * | 3/2009 | Chiles | ............ | F23G 7/068 134/22.1 |
| 8,124,017 B2 * | 2/2012 | Harold | ............ | B01D 53/8631 422/129 |
| 8,237,006 B2 * | 8/2012 | Stone | ............ | C10J 3/00 588/321 |
| 8,318,115 B2 * | 11/2012 | Harold | ............ | B01D 53/8631 423/210 |
| 8,459,193 B2 * | 6/2013 | Mulcahy | ............ | F23G 5/027 110/229 |
| 8,740,613 B1 * | 6/2014 | Friend | ............ | F27D 19/00 432/179 |
| 9,651,249 B2 * | 5/2017 | Gosiewski | ............ | F23G 5/46 |
| 10,174,942 B2 * | 1/2019 | Kashiwagi | ............ | F23G 7/065 |
| 2003/0035762 A1 | 2/2003 | Cash | | |
| 2004/0103832 A1 * | 6/2004 | Gross | ............ | F23G 7/10 110/346 |
| 2005/0153252 A1 * | 7/2005 | Crawley | ............ | F01N 3/323 431/5 |
| 2005/0260103 A1 * | 11/2005 | Tesar | ............ | F23G 7/068 422/110 |
| 2006/0144700 A1 | 7/2006 | Carson et al. | | |
| 2007/0033873 A1 * | 2/2007 | D'Souza | ............ | B01J 8/0496 48/198.7 |
| 2007/0042306 A1 | 2/2007 | Bacon | | |
| 2008/0244975 A1 * | 10/2008 | Johnston | ............ | B01J 19/249 48/197 FM |
| 2011/0209698 A1 * | 9/2011 | Mulcahy | ............ | C10J 3/26 126/85 R |
| 2012/0122046 A1 * | 5/2012 | Tsantrizos | ............ | C10J 3/02 432/2 |
| 2012/0128541 A1 * | 5/2012 | Kashiwagi | ............ | F23J 1/06 422/173 |
| 2012/0192547 A1 * | 8/2012 | Mastbergen | ............ | F01N 3/025 60/274 |

\* cited by examiner

THERMAL OXIDIZATION SYSTEMS AND METHODS

FIELD OF THE INVENTION

The present disclosure generally relates to a thermal oxidation of waste gas (e.g., toxic release inventory ("TRI") gases, particularly volatile organic compound ("VOC")) into desirable oxidized gases including carbon dioxide gas ($CO_2$), water vapor ($H_2O$), nitrogen gas ($N_2$) and oxygen gas ($O_2$).

The present disclosure specifically relates to a controlled thermal oxidation of the waste gas involving a regulated combustible mixture of the waste gas and an oxidant (e.g., atmospheric air), a regulated combustion reaction of the combustible mixture into desirable oxidized gases and/or a regulated atmospheric venting of desirable oxidized gases.

BACKGROUND OF THE INVENTION

FIG. 1 illustrates a thermal oxidizer 20 known in the art of the present disclosure. Thermal oxidizer 20 employs a heating chamber 21 and a perforated oxidation reaction ("POR") chamber 24 forming a fluid flow path for a desired oxidation of a waste gas stream 32 (e.g., TRI gases) into oxidized gases 41 (e.g., $CO_2$, $H_2O$, $N_2$ and $O_2$).

In operation, a heating element 22 within heating chamber 21 is activated to generate heat waves 23 for heating waste gas stream 32 as waste gas stream 32 is feed from a waste gas source 30 via an inlet conduit 31 through heating chamber 21 into POR chamber 24 and as an oxidant 10 (e.g., atmospheric air) flows into POR chamber 24. The heating of waste gas stream 32 is intended to facilitate a combustible oxidation 40 of waste gas stream 32 within POR chamber 24 into oxidized gases 41. However, there are design flaws with thermal oxidizer 20 that impedes a combustible oxidation 40 of waste gas stream 32 within POR chamber 24 into oxidized gases 41.

First, thermal oxidizer 20 fails to regulate a combustible mixture of waste gas stream 32 and oxidant 10 within a flammable range between an upper explosive limit ("UEL") and a lower explosive level ("LEL") as known in the art of the present disclosure, particularly when waste gas stream 32 enters heating chamber 21 at a concentration below the LEL for waste gas stream 32 (i.e., waste gas is to lean). Specifically, a simultaneous suction of oxidant 10 into POR chamber 24 and venting of any gases within POR chamber 24 impedes a sufficient flow of oxidant 10 into POR chamber 24 to ensure a combustible mixture of waste gas stream 32 and oxidant 10 within the flammable range. Consequently, while the combustible mixture of waste gas stream 32 and oxidant 10 may be within the flammable range upon a power-on of thermal oxidizer 20, the mixture of waste gas stream 32 and oxidant 10 will eventually become too "rich" for combustible oxidation 40 within POR chamber 24. As a result, an incomplete combustion facilitates a buildup of high concentrations of undesirable gases (e.g., carbon monoxide (CO)) and soot within POR chamber 24.

Second, thermal oxidizer 20 fails to regulate a combustion reaction of waste gas stream 32 within POR chamber 24. Specifically, thermal oxidizer 20 does not regulate the heating of heating element 22. Consequently, additional undesirable gases (e.g., nitrogen oxides (NO) and ($NO_2$)) (not shown) may form within POR chamber 24 if a temperature of heating waves 23 is too high. Moreover, even if the heating of heating element 22 was regulated, POR chamber 24 is configured and sized for an instantaneous combustible oxidation 40 of waste gas stream 32 without a sufficient retention time for a combustible mixture of waste gas stream 32 and oxidant 10, if any, to convert to desirable oxidized gases 41 (e.g., $CO_2$, $H_2O$, $N_2$ and $O_2$).

The inventions of the present disclosure overcome the drawbacks of prior heating element based thermal oxidizers, particularly thermal oxidizer 20 of FIG. 1.

SUMMARY OF THE INVENTION

One form of the inventions of the present disclosure is a thermal oxidizer employing an oxidation mixer, an oxidation chamber, a retention chamber and a heat dissipater forming a fluid flow path for thermal oxidation of a waste gas (e.g., toxic release inventory ("TRI") gases, particularly volatile organic compound ("VOC")).

In operation, the oxidation mixer facilitates a combustible mixture of the waste gas and an oxidant (e.g., atmospheric air) into a combustible waste gas stream.

For purposes of the inventions of the present disclosure, the term "combustible waste gas stream" broadly encompasses any stream of gas including molecules combinable with oxygen or combust resulting in heat and light, and excludes totally inert gases.

The oxidation mixer may be any form of any oxidation mixer as known in the art of the present disclosure and hereinafter conceived including, but not limited to, a venturi or distributed air-gas mixer.

The oxidation mixer may be fed the waste gas via any type of waste gas feeding mechanism known in the art of the present disclosure and hereinafter conceived including, but not limited to, (1) an aeration nozzle, (2) an aeration nozzle and back flow preventer and (3) an aeration nozzle, back flow preventer and blocking valve.

The oxidation mixer may be fed the oxidant via any type of oxidant feeding mechanism as known in the art of the present disclosure and hereinafter conceived including, but not limited to, (1) an open air inlet involving an inductive air/waste gas flow optionally providing flash back protection, (2) a force modulation air blower with a mixing "T" or (3) a forced modulation air pump and mixing "T".

A heating element of the oxidation chamber generate heat waves facilitating a primary combustion reaction of the combustible waste gas stream flowing from the oxidation mixer to the oxidation chamber.

For purposes of the inventions of the present disclosure, (1) the term "heating element" broadly encompasses any element for converting electricity into heat through the process of Joule/ohmic/resistive, inductive or other means of electrical heating, (2) the term "primary combustion reaction" broadly encompasses an oxidation of the combustible waste gas stream flowing from the oxidation mixer into the oxidation chamber involving a partial combustion of the combustible waste gas stream within the oxidation chamber resulting in an oxygenated waste gas stream, and (3) the term "oxygenated waste gas stream" broadly encompasses a partial combustion of the combustible waste gas stream in many forms including, but not limited to, CO+other hydrocarbon compounds+$CO_2$+$H_2O$+$N_2$+excess $O_2$.

The oxygenated waste gas stream flows from the oxidation chamber into the retention chamber whereby the retention chamber facilitates a secondary combustion reaction as needed of the oxygenated waste gas stream into oxidized gases. For purposes of the inventions of the present disclosure, the term "secondary combustion reaction" encompasses a complete oxidation of the oxygenated waste gas stream flowing from the oxidation chamber to the retention chamber involving a conversion of the oxygenated waste gas stream into oxidized gases (e.g., $CO_2$, $H_2O$, $N_2$ and $O_2$). The retention chamber may also include an additional heating element to facilitate the complete oxidation of oxygenated waste gas stream into oxidized gases.

Concurrently or alternatively, the oxidation chamber may further include an supplemental oxidant inlet for mixing additional oxidant to the oxygenated waste gas stream into a combustible oxygenated waste gas stream flowing into the retention chamber.

The heat dissipater facilitates an atmospheric venting of the oxidized gases flowing into the heat dissipater from the retention chamber.

The heating element of the oxidation chamber and the optional heating element of the retention chamber may be powered via an on/off switch or a temperature modulation control scheme. Further, if the heating element of the retention chamber is employed, the heating elements of the oxidation chamber and the retention chamber may be separate heating elements or a single integrated heating element.

Another form of inventions of the present disclosure is an oxidation controller for controlling an operation of the thermal oxidizer.

In operation, the oxidation mixer facilitate the combustible mixture of a waste gas stream and an oxidant into a combustible waste gas stream. In operation, the oxidation mixer facilitates a combustible mixture of the waste gas and an oxidant into an combustible waste gas stream. A heating element of the oxidation chamber facilitates a primary combustion reaction of the combustible waste gas stream into an oxygenated waste gas stream. The retention chamber facilitates a secondary combustion reaction of the oxygenated waste gas stream into oxidized gases. The heat dissipater atmospherically vents of the oxidized gases. An oxidization controller may be employed to regulate the operation of the thermal oxidizer.

The oxidation controller may further regulate the waste gas feed and/or the oxidant feed into the oxidation mixer, and may further regulate the optional heating element of the retention chamber for the secondary combustion reaction if the heating element is employed.

The oxidation controller may further employ a data logger and a data reporter for respectively logging and reporting a regulation of the thermal oxidizer by the oxidation controller.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
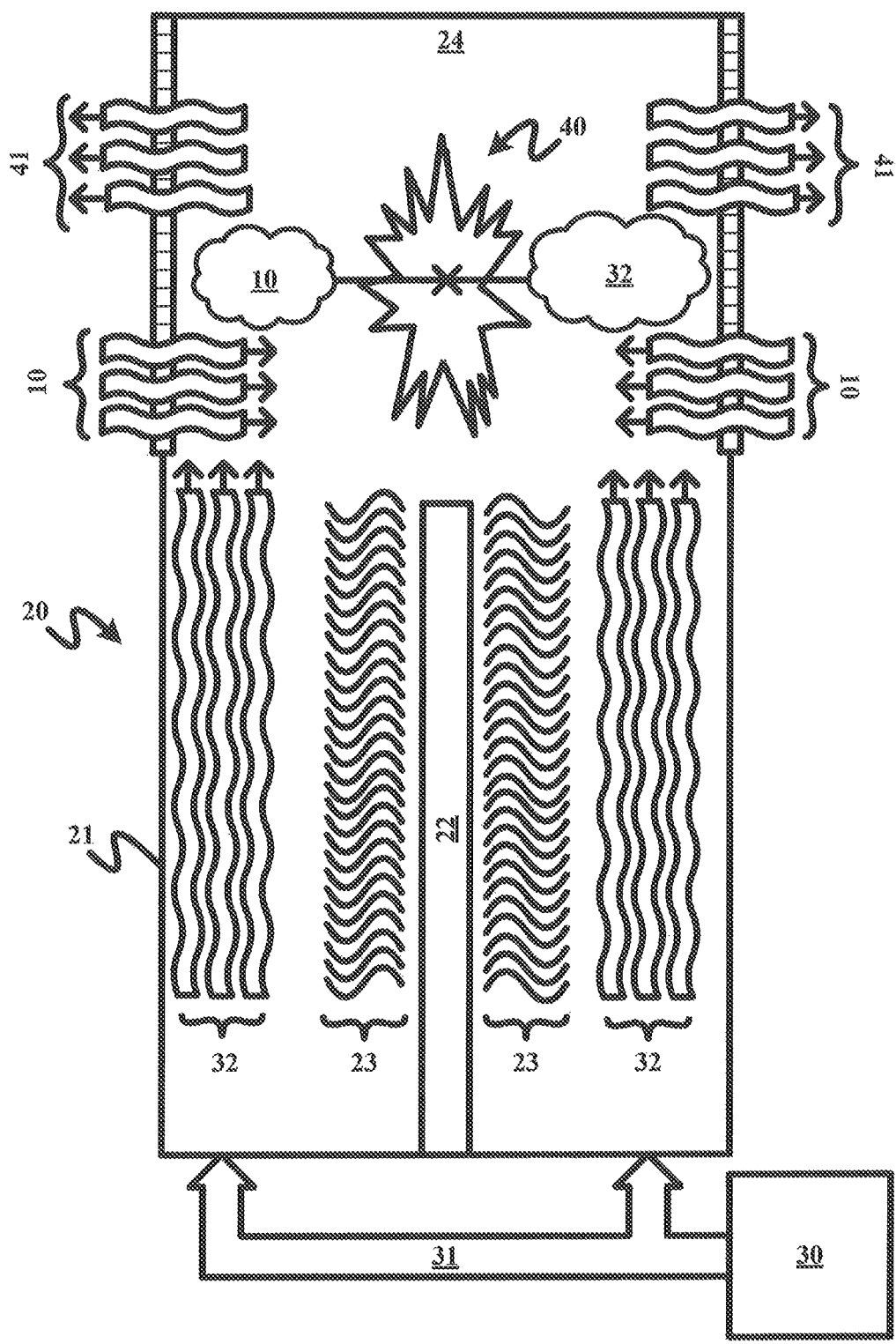
FIG. 1 illustrates a block diagram of an exemplary thermal oxidizer as known in the art.
Figure 2:
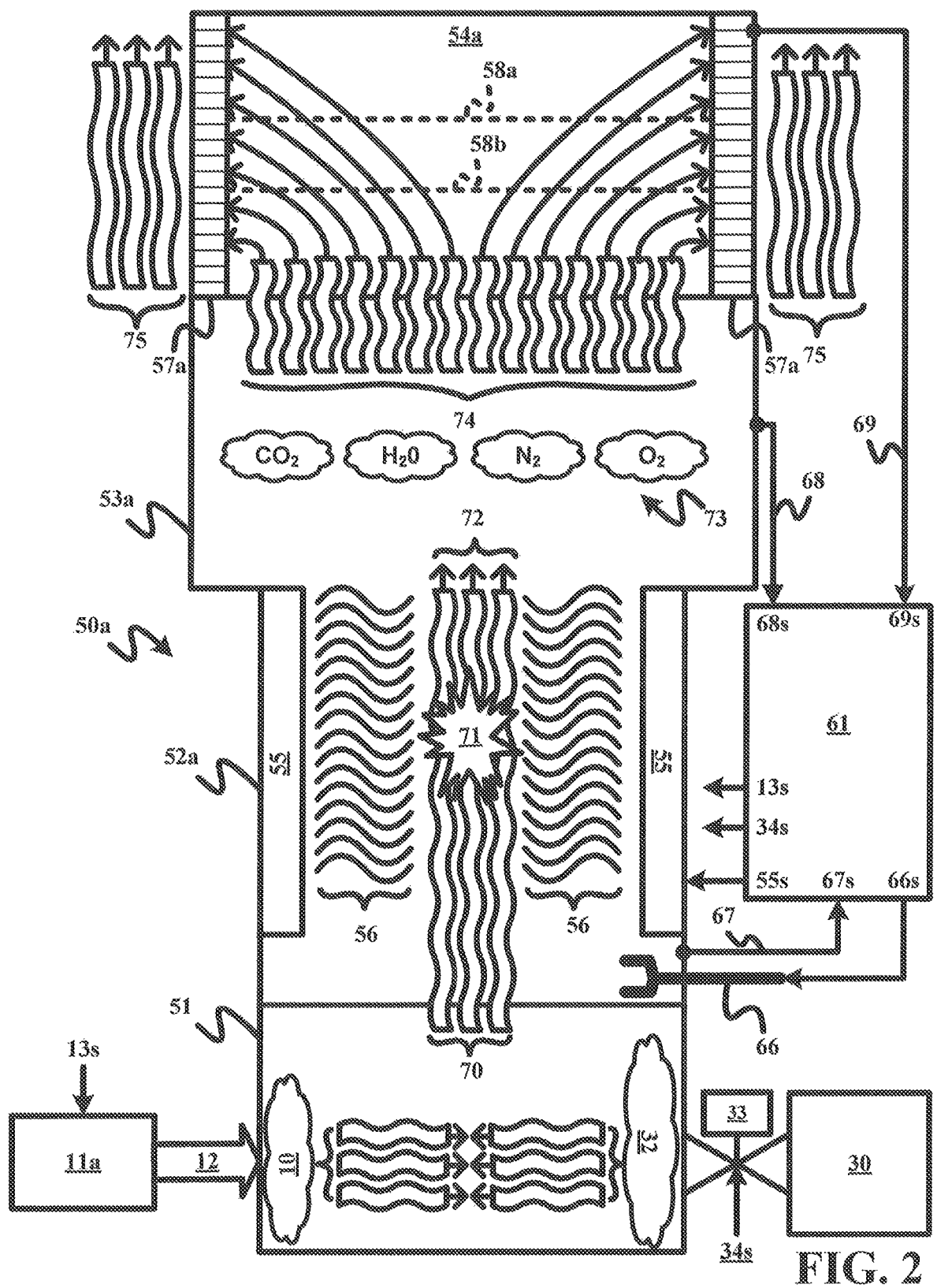
FIG. 2 illustrates a block diagram of a first exemplary chamber embodiment of a thermal oxidization system in accordance with the inventive principles of the present disclosure.
Figure 3:
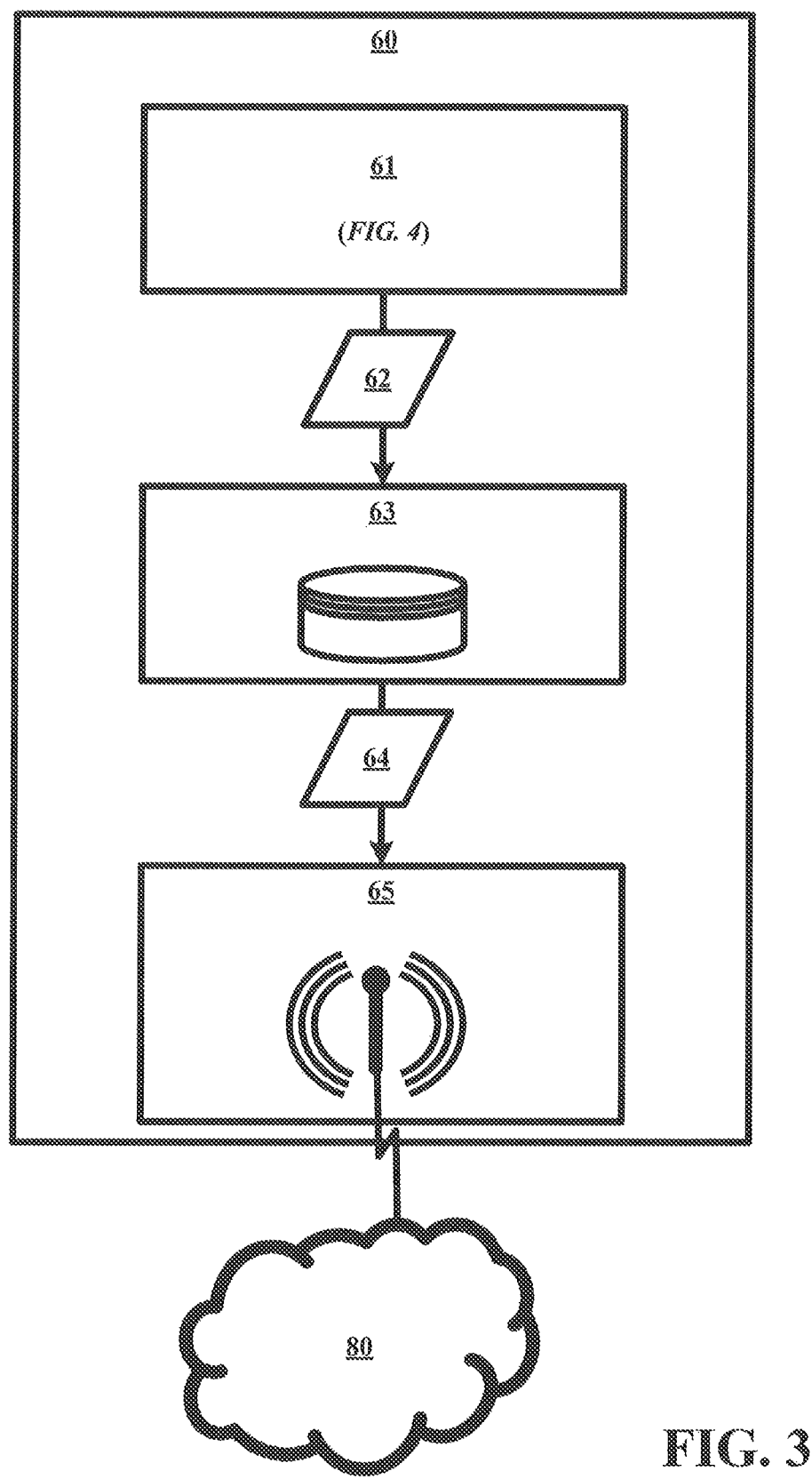
FIG. 3 illustrates a block diagram of an exemplary embodiment of a control system in accordance with the inventive principles of the present disclosure.

To facilitate art understanding of inventions of the present disclosure, the following description of FIGS. 2-4 teach basic inventive principles of thermal oxidization systems and thermal oxidization methods of the present disclosure. From this description, those having ordinary skill in the art will appreciate how to apply the inventive principles of the present disclosure for making and using additional numerous and various embodiments of thermal oxidization systems and thermal oxidization methods of the present disclosure.

Referring to FIG. 2, a thermal oxidization system of the present disclosure incorporates a thermal oxidizer 50a employing an oxidation mixer 51, an oxidation chamber 52a, a retention chamber 53a and a heat dissipater 54a forming a fluid flow path for oxidation of a waste gas stream 32 (e.g., TRI gases) into oxidized combustion products 74 (e.g., oxidized gases 73 including $CO_2$, $H_2O$, $N_2$ and $O_2$).

Oxidation mixer 51 is structurally configured for implementing a combustible mixture of an oxidant 10 supplied by oxidant supply 11 (e.g., a blower or a pump) via a supply line 12 and of a waste gas stream 32 (e.g., TRI gases) supplied by a waste gas source 30 as controlled via a control flow conduit 33 (e.g., a solenoid valve and a flame arrestor in series coupling waste gas source 30 to oxidation mixer 51) into a combustible waste gas stream 70.

In one embodiment, oxidation mixer 51 is a venturi air-gas mixer whereby turbulent fluid flows of oxidant 10 and waste gas stream 32 into the venture air-gas mixer are controlled via oxidant supply 11 and control flow conduit 33 to ensure combustible waste gas stream 70 attains proportional concentrations of oxidant 10 and waste gas stream 32 within a flammable range (e.g., 11.5:1 oxidant 10 to waste gas stream 32). Additionally, oxidation mixer 51 may be equipped with a nozzle (not shown) for regulating a feeding of combustible waste gas stream 70 into oxidation chamber 52a whereby the nozzle may be structurally configured to generate more turbulence to combustible waste gas stream 70.

Oxidation chamber 52a is structurally configured for implementing a primary combustion reaction 71 therein of combustible waste gas stream 70 into an oxygenated waste gas stream 72 via a controlled emission of heat waves 56 by a heating element 55. In one embodiment, oxidation chamber 52a is a refractory ceramic cylinder and heating element 55 is embedded within the walls of the refractory ceramic cylinder.

Optionally, oxidation chamber 52a may further employ a spark igniter 66 for a controlled ignition of combustible waste gas stream 70 at a proximal opening of oxidation chamber 52a. For this embodiment, if oxidization mixer 51 is equipped with a nozzle, then a distal tip of spark igniter 66 may be positioned within or adjacent to the flow of the combustible waste gas stream 70 out of the nozzle into oxidation chamber 52a.

Retention chamber 53a is structurally configured for implementing a retention time for a secondary combustion reaction of oxygenated waste gas stream 72 into heated oxidized combustion products 74 (e.g., oxidized gases 73 including $CO_2$, $H_2O$, $N_2$ and $O_2$). In one embodiment, retention chamber 53a is a refractory ceramic cylinder integrated with oxidation chamber 52a as shown.

Heat dissipater 54a is structurally configured for implementing a heat exchange of atmosphere air 75 with heated oxidized combustion products 74 to vent cooled oxidized combustion products 74 into the atmosphere. In one embodiment, heat dissipater 54a includes a heat exchanger 57a constructed of stainless-steel woven fabric which has been pleated and rolled into a cylinder shape whereby oxidized combustion products 74 exits heat exchanger 57a along a length and circumference of the vertical wall of heat exchanger 57a as shown with cooling atmosphere air 75 being directed vertically past the vertical wall of heat exchanger 57a to thereby extract heat from heat dissipater 54a.

Additionally, heat dissipater 54a may be equipped with mesh baffles (e.g., mesh baffles 58b and 58c as shown) axially aligned on a longitudinal axis of the cylindrical heat exchanger 57a to thereby provide a more controlled flow diversion of oxidized combustion products 74 in a direction of vertical wall of heat exchanger 57a as shown in FIG. 2.

Referring to FIG. 3, thermal oxidization system of the present disclosure further incorporates a control system employing an oxidation controller 61, a data logger 63 and a data reporter 65 housed within a control box 60.

Figure 4A:
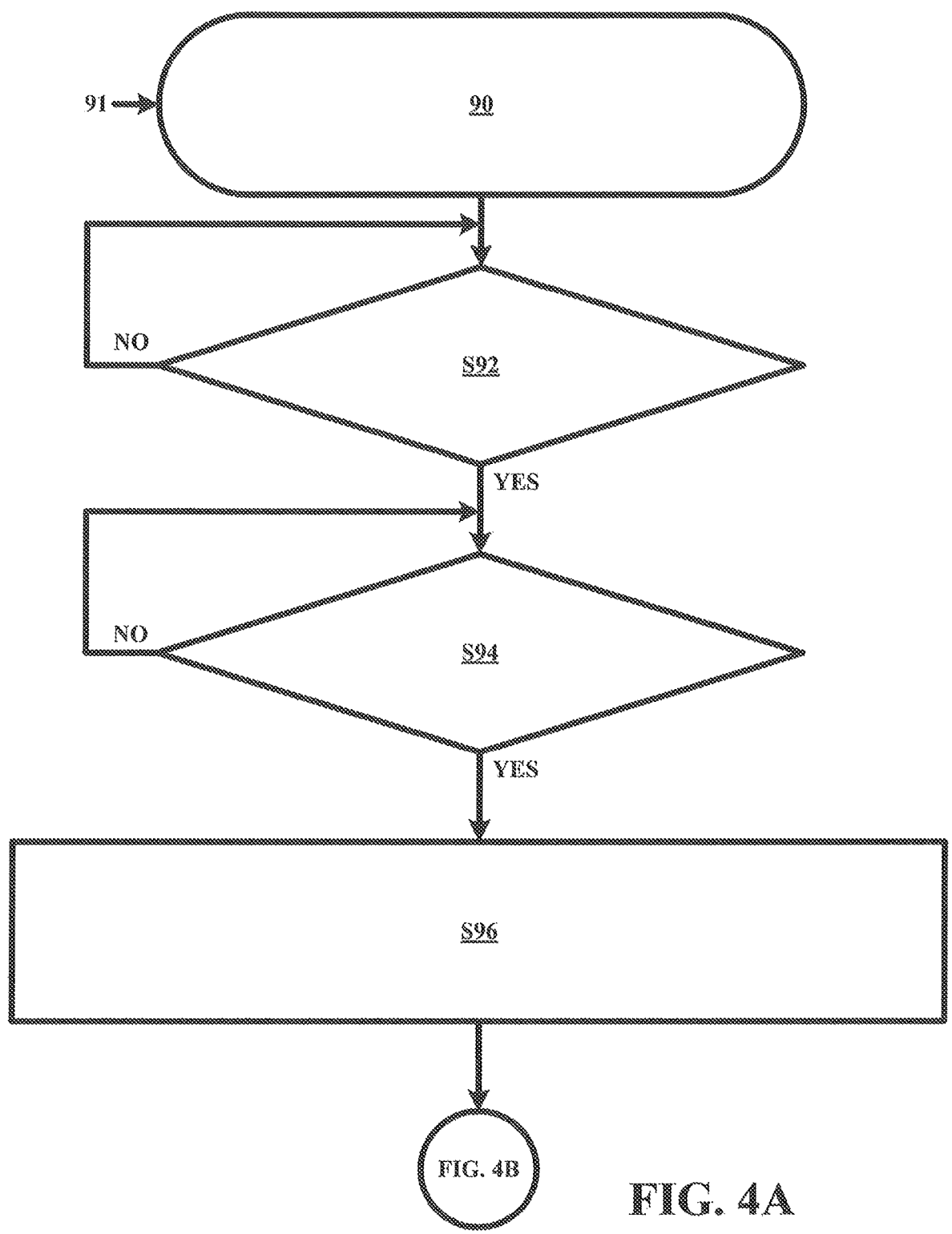
FIGS. 4A-4C illustrate a flowchart representative of an exemplary embodiment of a thermal oxidization method in accordance with the inventive principles of the present disclosure.
Figure 4B:
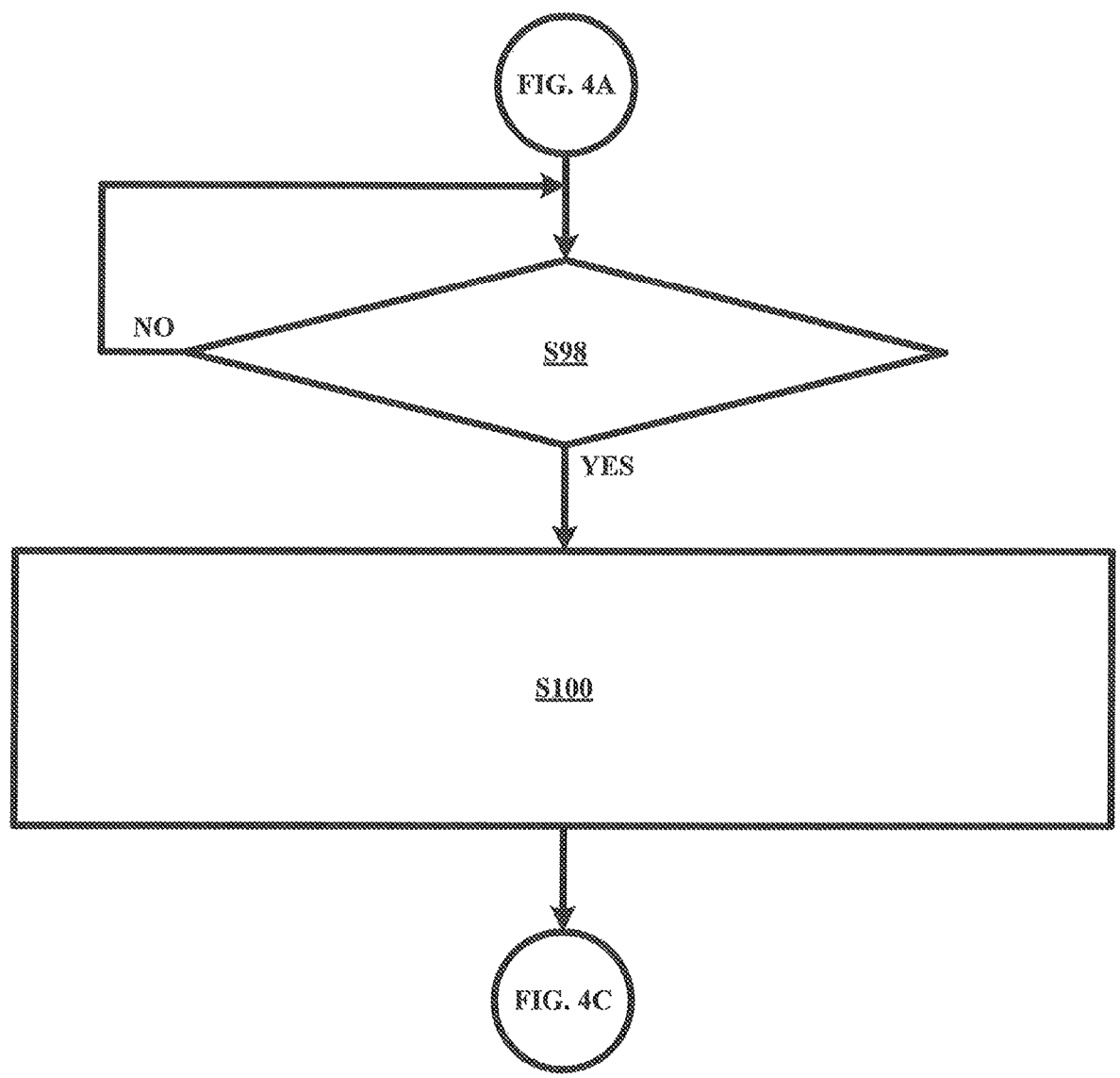
Figure 4C:
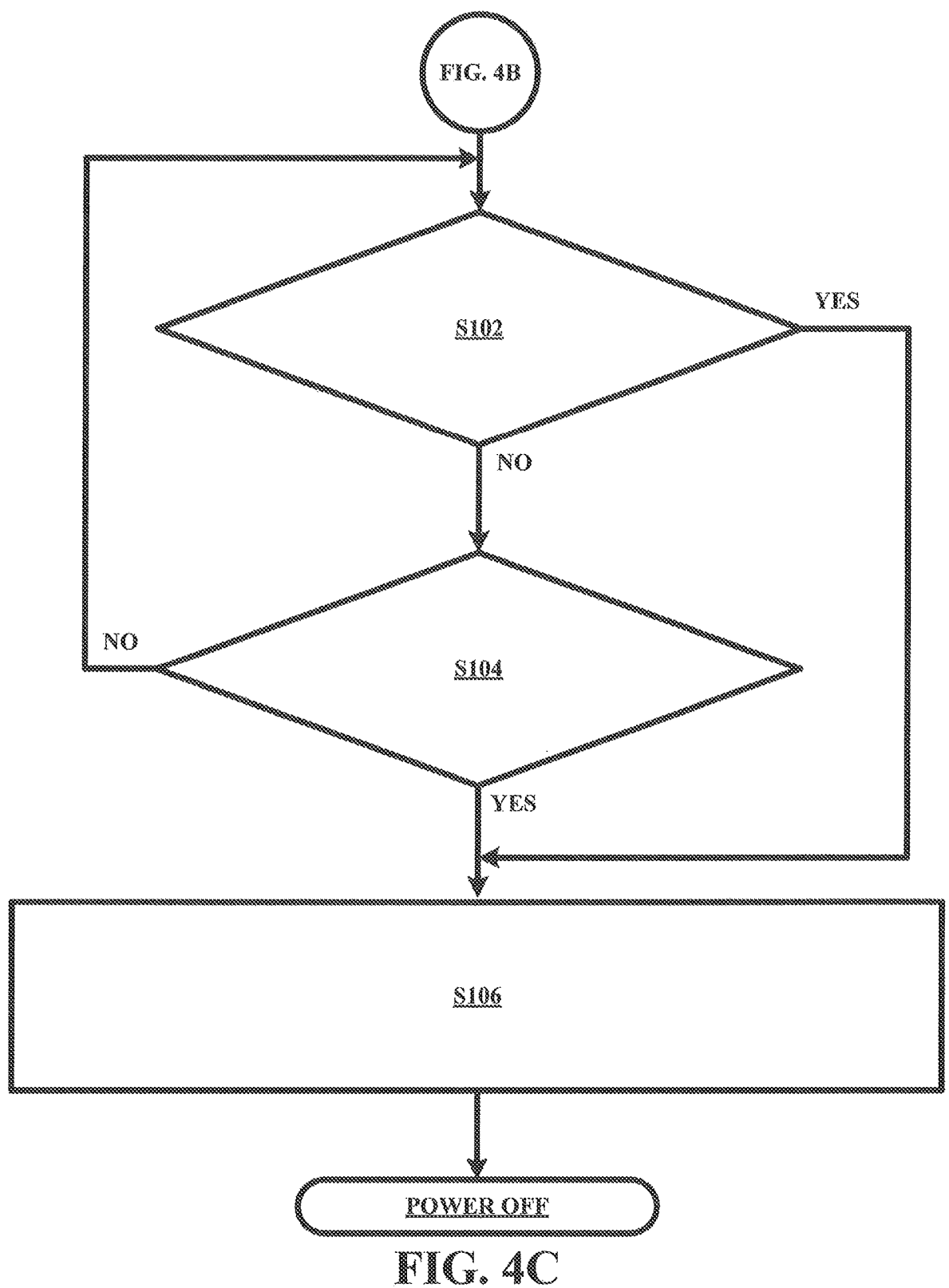

Oxidation controller 61 is structurally configured for controlling an operation of thermal oxidizer 50a as will be further described herein in connection with a description of FIGS. 4A-4C.

In one embodiment, oxidation controller 61 is an application specific main board or an application specific integrated circuit for controlling a thermal oxidation application of various inventive principles of the present disclosure as subsequently described herein in connection with FIGS. 4A-4C. The structural configuration of oxidation controller 61 may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for controlling an execution of the thermal oxidation application.

A non-limiting example of oxidation controller 61 is an all-in-one XL4 controller sold by Horner APG of Indianapolis, Ind. that is configured in accordance with the inventive principles of the present disclosure.

Data logger 63 is structurally configured for logging operational data ("OD") 62 transmitted by oxidation controller 61 to data logger 63 via a push or pull operation, or by a monitoring of specific data points of oxidation controller 61 by data logger 63. Operational data 62 includes data informative of an operational status of thermal oxidizer 50a in executing the oxidation of waste gas stream 32.

In one embodiment, data logger 63 is an application specific main board or an application specific integrated circuit for controlling a data logging application of the present disclosure. The structural configuration of data logger 63 may include, but is not limited to, processor(s), computer-usable/computer readable storage medium(s), an operating system, application module(s), peripheral device controller(s), slot(s) and port(s). Each application module consists of an electronic circuit and/or an executable program (e.g., executable software and/or firmware stored on non-transitory computer readable medium(s)) for executing the data logging application.

A non-limiting example of data logger 63 is an all-in-one XLE controller sold by Horner APG of Indianapolis, Ind. that is configured in accordance with the inventive principles of the present disclosure.

Another non-limiting example of data logger 63 is as an application module configured within oxidation controller 61.

Also in practice, data logger 63 may be omitted and oxidation controller 61 may be configured for executing the data logging application of the present disclosure.

Data reporter 65 is structurally configured for receiving reporting data ("RD") 64 from data logger 63 via a push or pull operation and transmitting reporting data 64 to a network 80 (e.g., a cellular network). Reporting data 64 is operational data 62 processed by data logger 63 into a reporting format associated with data reporter 65.

In one embodiment, data reporter 65 is an application specific modem for executing a data reporting application of the present disclosure.

A non-limiting example of data logger 66 is a SonicU™ modem sold by SonicU, LLC of Greenfield, Ind. that is configured in accordance with the inventive principles of the present disclosure.

Referring back to FIG. 2, oxidation controller 61 regulates a control of thermal oxidizer 50a in accordance with a thermal oxidization method of the present disclosure as represented by a flowchart 90 shown in FIGS. 4A-4C. In support of executing the thermal oxidization method:

1. oxidation controller 61 senses and controls a flash point temperature $T_{FP}$ of oxidation chamber 52a via a connection of thermocouple 67 at a signal input 67s;
2. oxidation controller 61 senses and controls an oxidation point temperature $T_{OP}$ of retention chamber 53a via a connection of thermocouple 68 at a signal input 68s;
3. oxidation controller 61 senses and controls a venting point temperature $T_{FP}$ of heat dissipater 54a via a connection to thermocouple 69 at a signal input 69s;
4. oxidation controller 61 controls a feeding rate of oxidant 10 by oxidant supply 11 via a connection of a signal output 13s to oxidant supply 11a;
5. oxidation controller 61 controls a feeding rate of waste gas stream 32 by waste gas source 30 via a connection of a signal output 34s to control flow conduit 33;

6. oxidation controller 61 controls an activation and a deactivation of heating element 55 via a signal output 55*s*; and
7. oxidation controller 61 controls an activation and a deactivation of spark igniter 66 via a signal output 66*s*;

Referring to FIGS. 2 and 4A, prior to be oxidation controller 61 being powered-on, oxidant supply 11 is deactivated and control flow conduit 33 is closed.

Upon oxidation controller 61 being powered-on, oxidation controller 61 executes flowchart 90, and initiates a transmission of a point monitoring of flash point temperature $T_{FP}$, oxidization point temperature $T_{OP}$ and venting point temperature $T_{VP}$ to data logger 63 for recording purposes.

As to the execution of flowchart 90 by oxidation controller 61, a stage S92 of flowchart 90 encompasses a thermocouple validity check ("TVC") by oxidation controller 61 concurrently or sequentially involving:
1. a comparison by oxidation controller 61 of flash point temperature $T_{FP}$ relative to a flash thermocouple validity threshold ("FTVT");
2. a comparison by oxidation controller 61 of oxidation point temperature $T_{OP}$ relative to an oxidation thermocouple validity threshold ("OTVT"); and
3. a comparison by oxidation controller 61 of venting point temperature $T_{VP}$ relative to a venting thermocouple validity threshold ("VTVT").

In practice, to test the validity of the thermocouples, the thermocouple validity thresholds should be set at an anticipated maximum room temperature (e.g., 22° C.) or to an anticipated maximum local outdoor air temperature.

For a TVC cycle of stage S92, if flash point temperature $T_{FP}$ is more than flash thermocouple validity threshold FTVT, OR if oxidation point temperature $T_{OP}$ is more than oxidation thermocouple validity threshold OTVT, OR if venting point temperature $T_{VP}$ is more than venting thermocouple validity threshold VTVT, then oxidation controller 61 is powered down for a maintenance inspection of the thermocouple(s) and powered on again after a successful repair/replacement, if any, of the thermocouple(s).

Otherwise, if flash point temperature $T_{FP}$ is less than or equal to flash thermocouple validity threshold FTVT, AND if oxidation point temperature $T_{OP}$ is less than or equal to oxidation thermocouple validity threshold OTVT, AND if venting point temperature $T_{VP}$ is less than or equal to venting thermocouple validity threshold VTVT, then oxidation controller 61 proceeds to a stage S94 of flowchart 90 encompassing a thermal oxidation limit check ("TOLC") by oxidation controller 61 concurrently or sequentially involving:
1. a comparison by oxidation controller 61 of flash point temperature $T_{FP}$ relative to a flash thermal limit threshold ("FTLT");
2. a comparison by oxidation controller 61 of oxidation point temperature $T_{OP}$ relative to an oxidation thermal limit threshold ("OTLT"); and
3. a comparison by oxidation controller 61 of venting point temperature $T_{VP}$ relative to a venting thermal limit threshold ("VTLT").

In practice, to ensure a safe heat activation of oxidation chamber 52*a*, the thermal limit thresholds should represent a predefined maximum temperature of oxidation chamber 52*a*, retention chamber 53*a* and heat dissipater 54*a* prior to the heat activation of thermal oxidizer 50*a* (e.g., 300° F. for all thermocouple limit thresholds).

For a TOLC cycle of stage S94, if flash point temperature $T_{FP}$ is more than flash thermal limit threshold FTLT, OR if oxidation point temperature $T_{OP}$ is more than oxidation thermal limit threshold OTLT, OR if venting point temperature $T_{VP}$ is more than venting thermal limit threshold VTLT, then oxidation controller 61 returns to stage S94 to execute a new TOLC cycle.

Otherwise, if flash point temperature $T_{FP}$ is less than or equal to flash thermal limit threshold FTLT, AND if oxidation point temperature $T_{OP}$ is less than or equal to oxidation thermal limit threshold OTLT, AND if venting point temperature $T_{VP}$ is less than or equal to venting thermal limit threshold VTLT, then oxidation controller 61 proceeds to a stage S96 of flowchart 90 to execute a pre-oxidation stage of the thermal oxidation of waste gas stream 32 sequentially involving:
1. with control flow conduit 33 being closed via valve control signal VC (e.g., a binary open-close signal) and heating element 55 being deactivated via heat regulation signal HR (e.g., an AC current), oxidation controller 61 controlling a gaseous purge of thermal oxidizer 50*a* by activating oxidant supply 11 via a supply control signal SC (e.g., a digital amplitude signal) for a specified time period. For example, oxidation controller 61 may activate oxidant supply 11 via supply control signal for an oxidation feed of oxidant 10 (e.g., atmospheric air) into oxidation mixer 51 at a 100% oxidation feed rate of oxidized gas 10 for thirty (30) seconds to one (1) minute (e.g., the feed rate in cubic feet/minute over a duration exceeding at least four (4) times a volume of oxidation chamber 52*a* and retention chamber 53*a*);
2. after completion of the purge, oxidation controller 61 controlling an activation of oxidant supply 11 via supply control signal SC for an oxidation feed of oxidant 10 into oxidation mixer 51 at a 50% oxidation feed rate; and
3. concurrent with or subsequent to the 50% oxidation feed rate of oxidant 10 into oxidation mixer 51, oxidation controller 61 executing a zero crossover regulation of heating element 55 via heating regulation signal HR.

Upon executing stage S96, oxidation controller 61 proceeds to a stage S98 of flowchart 90 encompassing an oxidation chamber ignition check ("OCIC") by oxidation controller 61 involving a comparison by oxidation controller 61 of flash point temperature $T_{FP}$ relative to a oxidation chamber ignition threshold ("OCIT") (e.g., 1100° F.).

Oxidation controller 61 cycles through stage S98 until such time flash point temperature $T_{FP}$ is equal to or greater than oxidation chamber ignition threshold OCIT whereby oxidation controller 61 proceeds to a stage S100 of flowchart 90 to execute an oxidation stage of the thermal oxidation of waste gas stream 32 sequentially involving:
1. if spark ignitor 57 is employed, oxidation controller 61 controlling a spark ignition of combustible waste gas stream 70 within oxidation chamber 52*a* by activating spark igniter 57 via a spark ignition signal S1 provided to a power supply of spark igniter 57 (not shown for clarity) (e.g., a spark plug transformer based power circuit). The spark ignition is executed to facilitate the primary combustion reaction 71 of combustible waste gas stream 70 within oxidation chamber 52*a*; and
2. oxidation controller 61 controlling an activation of a waste gas feed (e.g., 0.35 cubic feet/minute; 21 cubic feet/hour) into oxidation mixer 51 by opening control flow conduit 33 via valve control signal VC to form combustible waste gas stream 70 whereby oxidant 10 flowing into oxidation mixer 51 will create vacuum on waste gas stream 30 at the inlet of the oxidization mixer 51; and 3. oxidation controller 61 controlling a regulation of a secondary combustion reaction of oxygenated waste gas stream 72 within retention chamber 53a by modulating the oxidation feed rate of oxidant 10 by oxidant supply 11 based on a comparison of oxidation point temperature $T_{OP}$ relative to a oxidation feed modulation threshold ("OFMT") (e.g., 1400° F.). For example, the oxidation feed rate of oxidant 10 is increased if the oxidation point temperature $T_{OP}$ is less than the oxidation feed modulation threshold OFMT and conversely, the oxidation feed rate of oxidant 10 is decreased if the oxidation point temperature $T_{OP}$ is greater than the oxidation feed modulation threshold OFMT.

Upon executing stage S100, oxidation controller 61 proceeds to a stage S102 of flowchart 90 encompassing an oxidation protection check ("OPC") by oxidation controller 61 concurrently or sequentially involving:

1. a comparison by oxidation controller 61 of flash point temperature $T_{FP}$ relative to a flash point protection threshold ("FPPT");
2. a comparison by oxidation controller 61 of oxidation point temperature $T_{OP}$ relative to an oxidation point protection threshold ("OPPT"); and
3. a comparison by oxidation controller 61 of venting point temperature $T_{VP}$ relative to a venting point protection threshold ("VPPT").

In practice, to ensure oxidation protection of thermal oxidizer 50, the protection thresholds should represent a predefined maximum temperature of oxidation chamber 52a, retention chamber 53a and heat dissipater 54a during oxidation stage S100 (e.g., 1400° F. for oxidation chamber 52a, 1800° F. for retention chamber 53a and 300° F. for heat dissipater 54a).

For a OPC cycle of stage S102, if flash point temperature $T_{FP}$ is less than flash point protection threshold FPPT, AND if oxidation point temperature $T_{OP}$ is less than oxidation point protection threshold OPPT, AND if venting point temperature $T_{VP}$ is less than venting point protection threshold VPPT, then oxidation controller 61 proceeds to a stage S104 of flowchart 90 to be subsequently described herein.

Otherwise, if flash point temperature $T_{FP}$ is equal to or greater than flash point protection threshold FPPT, OR if oxidation point temperature $T_{OP}$ is equal to or greater than oxidation point protection threshold OPPT, OR if venting point temperature $T_{VP}$ is equal to or greater than venting point protection threshold VPPT, then oxidation controller 61 proceeds to a stage S106 of flowchart 90 to execute a shutdown stage of the thermal oxidation of waste gas stream 32 concurrently or sequentially involving:

1. oxidation controller 61 controlling a termination of waste gas feed into oxidation mixer 51 by closing control flow conduit 33 via valve control signal VC;
2. oxidation controller 61 controlling a deactivation of the zero crossover regulation of heating element 55 via heat regulation signal HR; and
3. oxidation controller 61 controlling an attenuation of the oxidation fee rate of oxidant 10 to zero (0) via supply control signal SC.

Upon completion of stage S106, oxidation controller 61 executes a power-off routine.

Still referring to FIG. 4C, stage S104 encompasses a waste gas limit check ("WGLC") by oxidization controller 61 involving:

1. a comparison by oxidation controller 61 of oxidation point temperature $T_{OP}$ relative to a waste gas limit threshold ("WGLT"); and
2. a comparison by oxidation controller 61 of an open duration $OD_{CV52}$ of control flow conduit 33 relative to a fixed time period X in any unit of time (e.g., seconds as shown).

In practice, the waste gas limit threshold represents a predefined temperature indicative of a failure to achieve a primary combustion reaction 71 within oxidation chamber 53a after time period X (e.g., ten (10) seconds) to thereby impede a flow of an unacceptable quantity of waste gas stream 32 through chambers 52a and 53a.

For a WGLP cycle of stage S104, if oxidation point temperature $T_{OP}$ is equal to or greater than waste gas limit threshold WGLT OR if open duration $OD_{CV52}$ of control flow conduit 33 is less than X seconds, then oxidation controller 61 returns to stage S102 as previously described herein.

Otherwise, if oxidation point temperature $T_{OP}$ is less than waste gas limit threshold AND if open duration $OD_{CV52}$ of control flow conduit 33 is equal to or greater than X seconds, then oxidation controller 61 proceeds to stage S106 as previously described herein.

Referring back to FIG. 3, previously stated herein, upon oxidation controller 61 being powered-on, data logger 62 initiates a recording of flash point temperature $T_{FP}$, oxidization point temperature $T_{OP}$ and venting point temperature $T_{VP}$ over a course of an execution of flowchart 90 by oxidation controller 61.

Furthermore, oxidation controller 61 may provide a local reporting of flash point temperature $T_{FP}$, oxidization point temperature $T_{OP}$ and venting point temperature $T_{VP}$ via a graphical display and/or data reporter 65 may provide a remote reporting of flash point temperature $T_{FP}$, oxidization point temperature $T_{OP}$ and venting point temperature $T_{VP}$ via a wireless communication to network 80.

In practice, oxidation controller 61 and/or data logger 63 may be further structurally configured to detect conditions suitable for a warning (e.g., a visual and/or audial alarm, and/or a text message) to be locally issued by oxidation controller 61 or remotely issued by data reporter 65. Such conditions include, but are not limited to, (1) a continual cycling of stage S94 indicative of an operational issue with thermal oxidizer 50, (2) an inability of oxidation chamber 52a to reach oxidation combustion ignition threshold OCIT during stage S98, and (3) an occurrence offstage S104 as an indication of an operational issue of thermal oxidizer 50.

In practice, the structural dimensions and material compositions of oxidation chamber 52, retention chamber 53a and heat dissipater 54a will be dependent upon the specific oxidation application (e.g., 20,000 BTU/hour of waste gas oxidization).

Figure 6A:
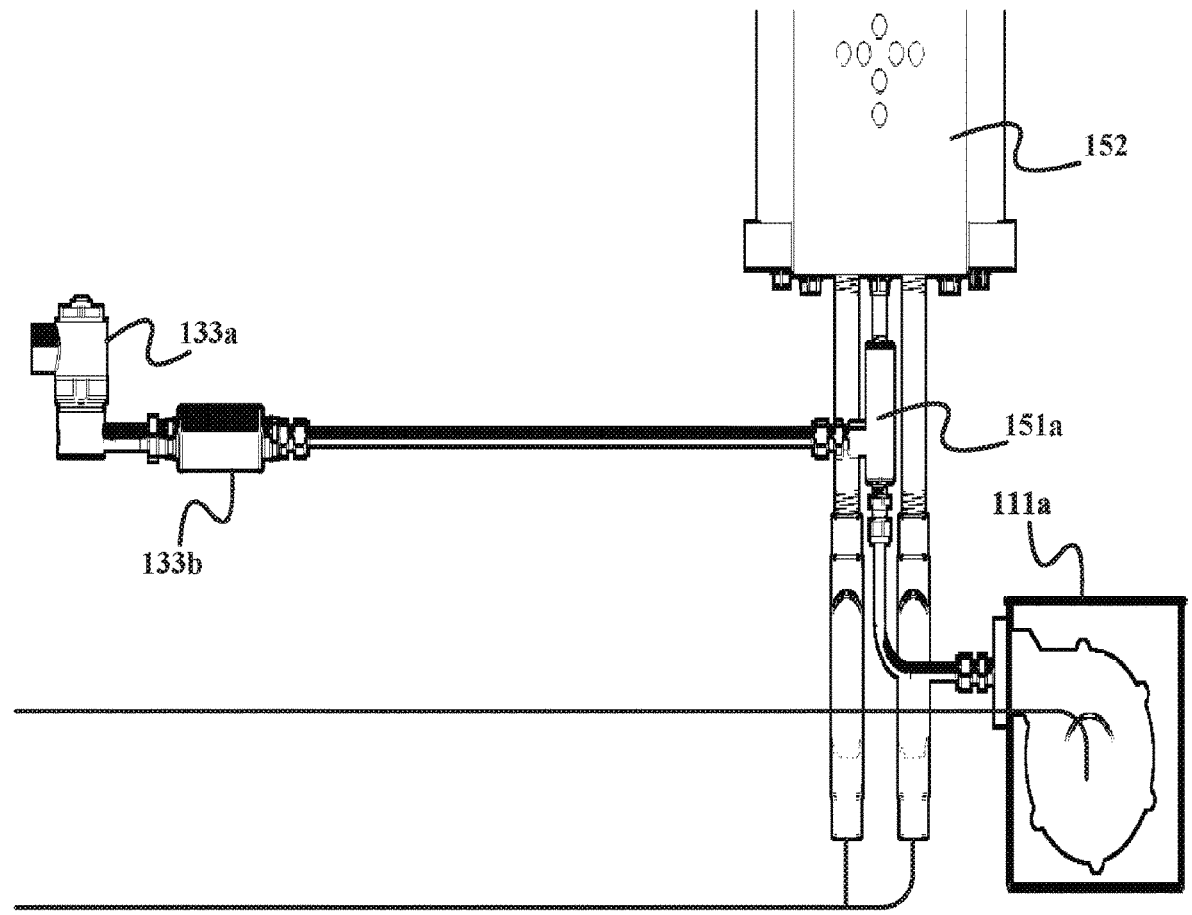
FIGS. 6A-6C illustrate exploded views of the thermal oxidization system of FIGS. 5A and 5B.
Figure 6B:
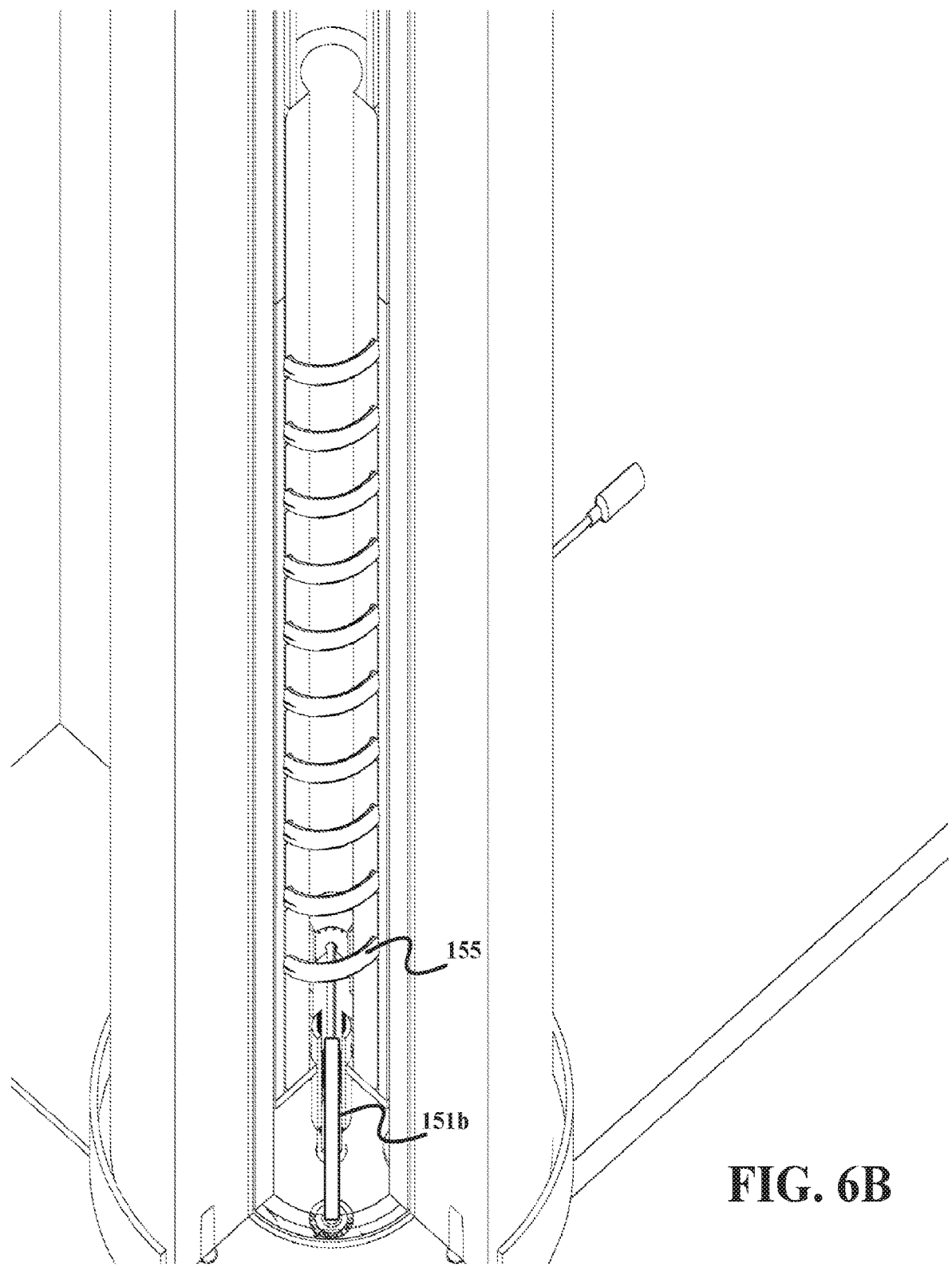
Figure 6C:
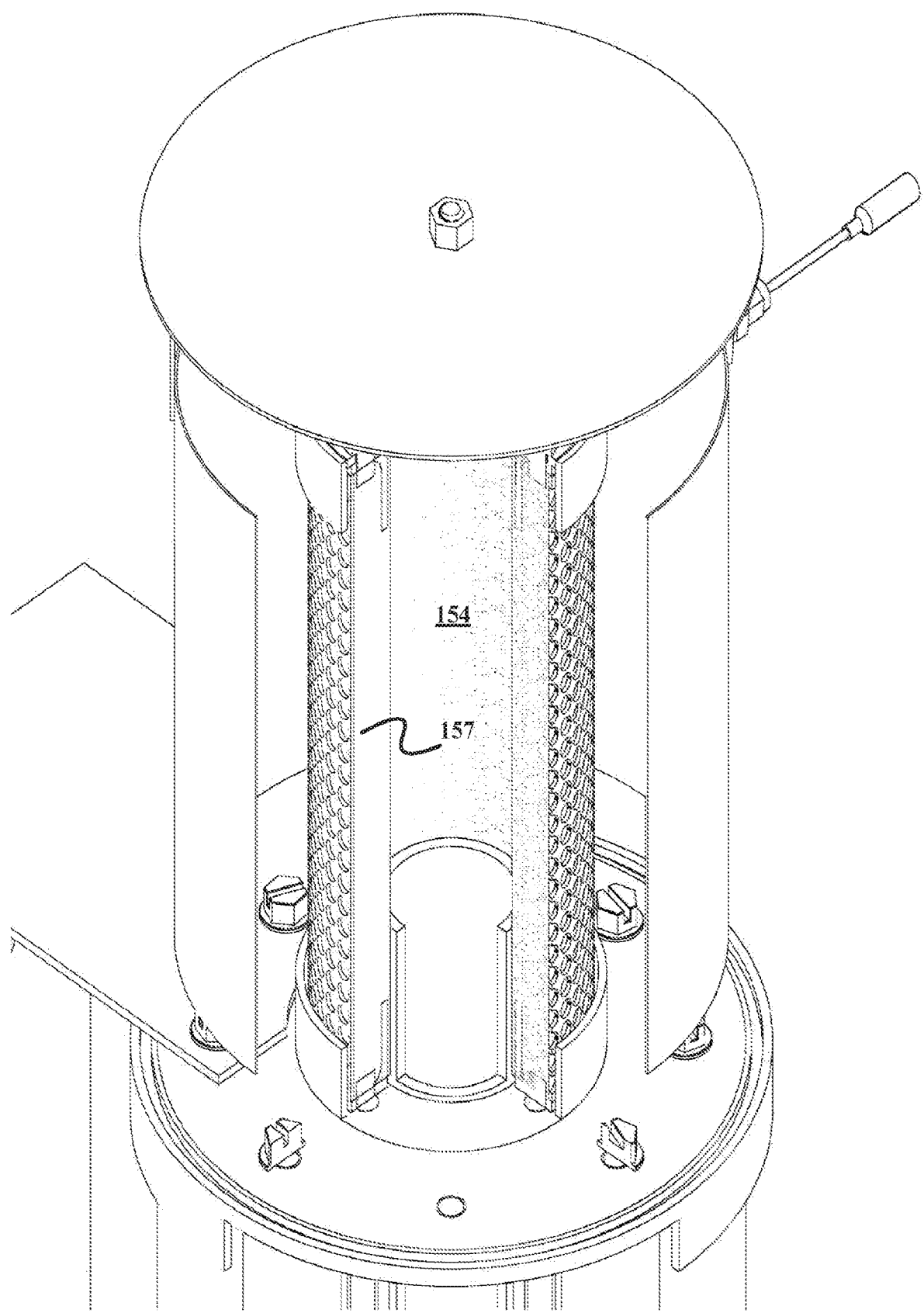
Figure 7:
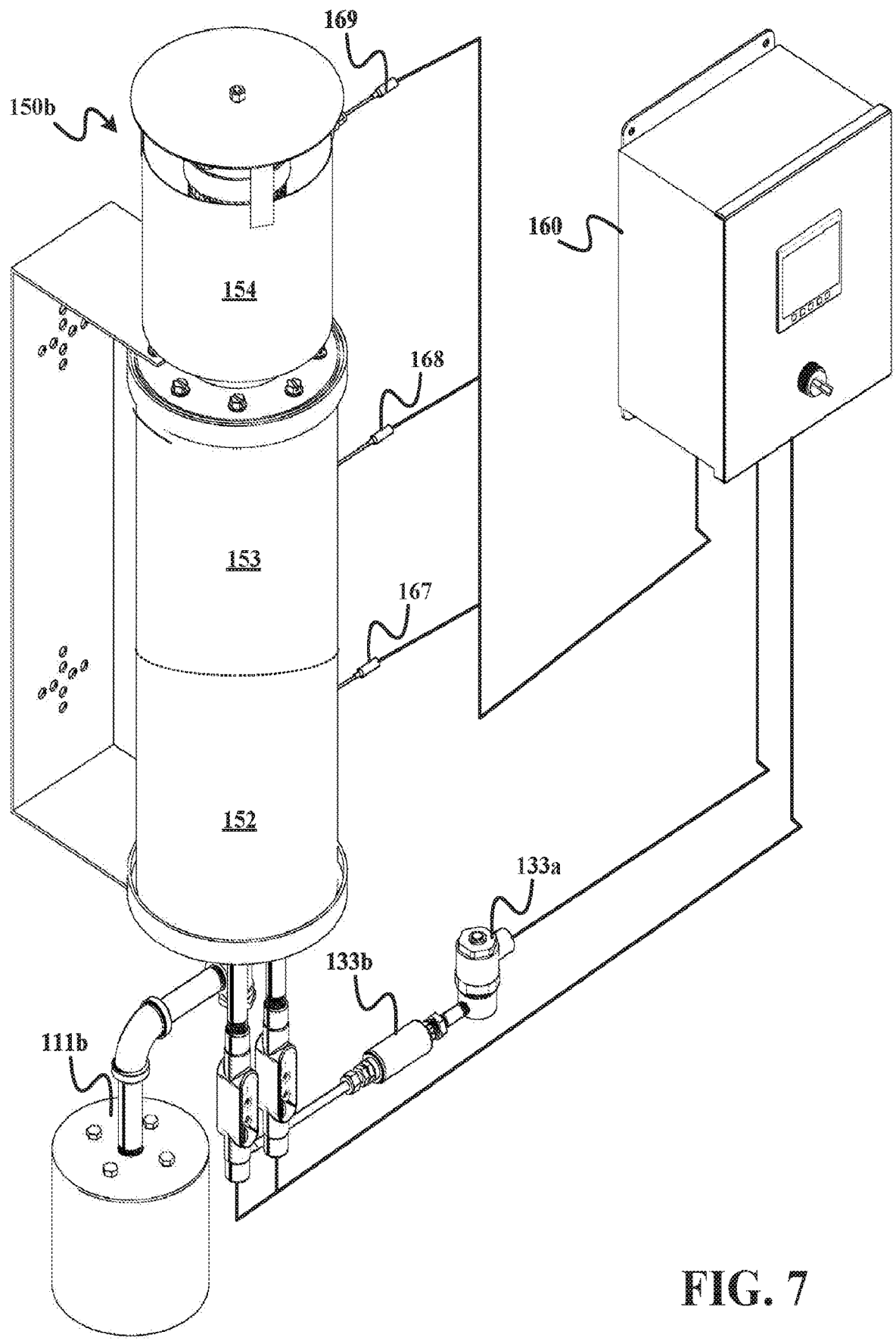
FIG. 7 illustrates a perspective view of a second exemplary embodiment of the thermal oxidization system of FIG. 2 in accordance with the inventive principles of the present disclosure.

To facilitate a further understanding of the inventions of the present disclosure, the following description of FIGS. 5-7 teach a couple of embodiments of the thermal oxidation system of FIG. 2. From this description; those having ordinary skill in the art will appreciate how to apply the inventive principles of the present disclosure for making and using numerous and various additional embodiments of thermal oxidization systems of the present disclosure.

Figure 5A:
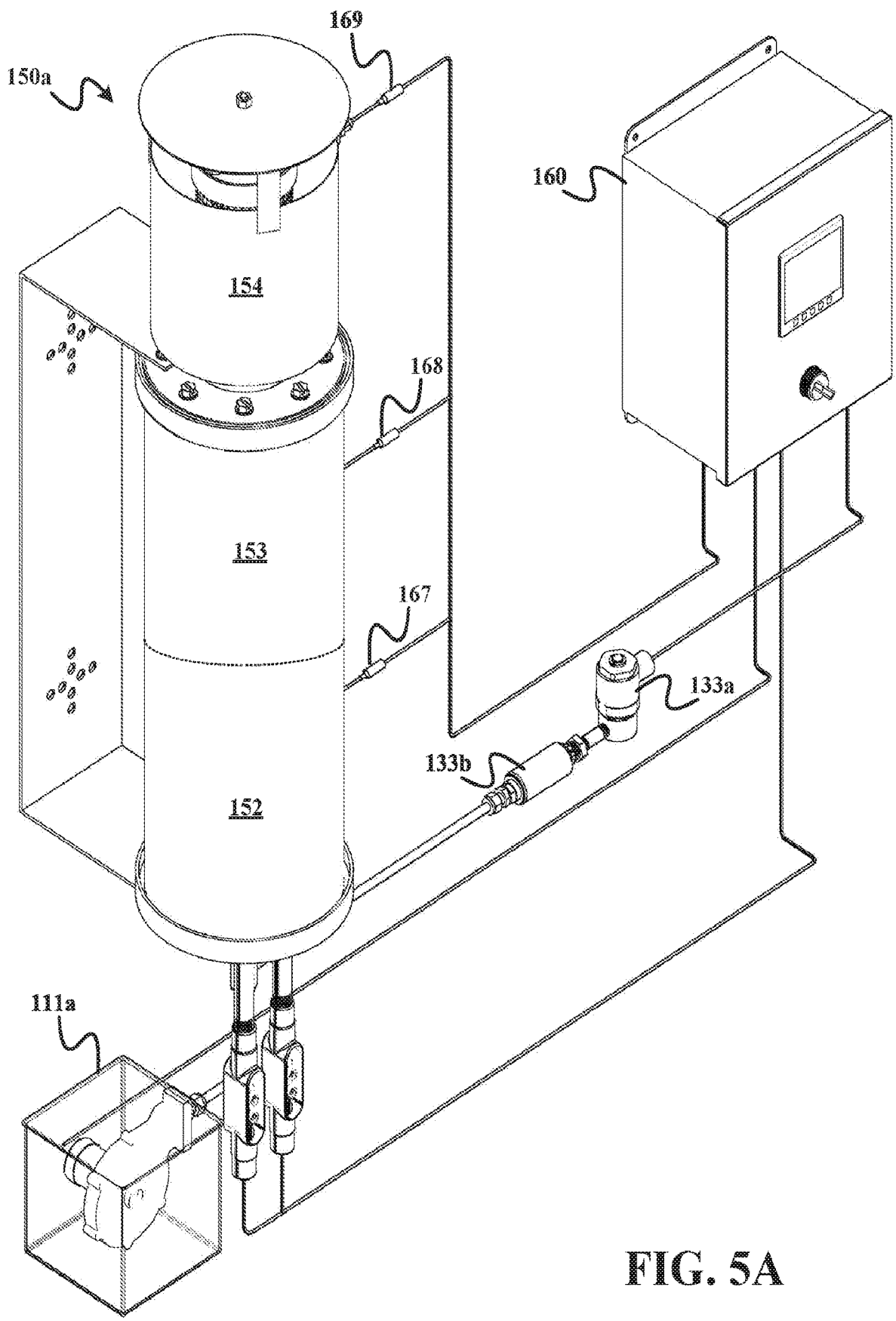
FIGS. 5A and 5B illustrate perspective views of a first exemplary embodiment of the thermal oxidization system of FIG. 2 in accordance with the inventive principles of the present disclosure.
Figure 5B:
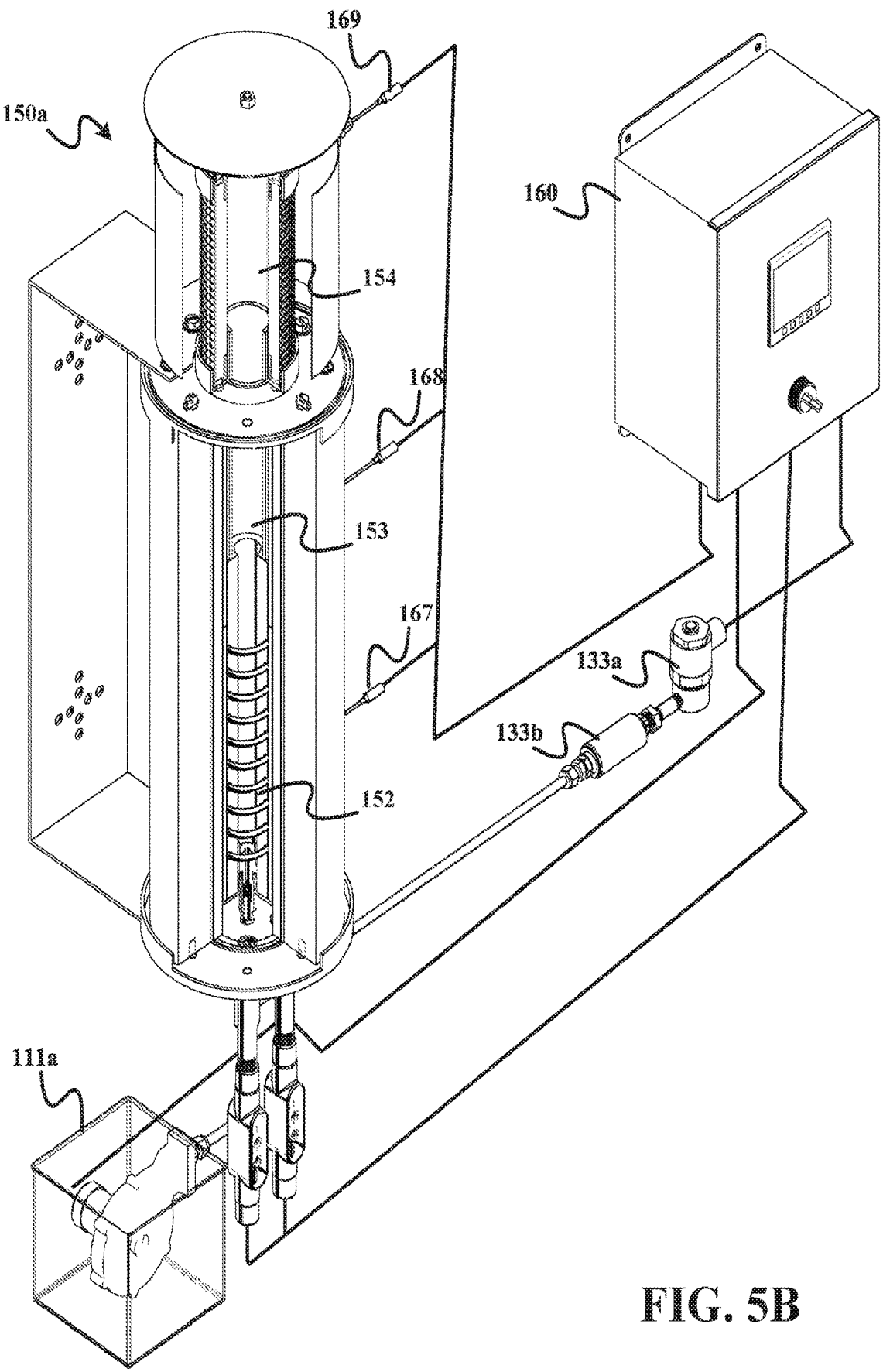

Referring to FIGS. 5A and 5B, an embodiment 150a of thermal oxidizer 50a (FIG. 2) employs:

1. oxidant supply 11 (FIG. 2) in the form of an air blower 111a;
2. oxidation mixer 51 (FIG. 2) in the form of a venturi air-gas mixer 151a (not shown in FIGS. 5A and 5B; shown in FIG. 6A);
3. a control flow conduit 33 in the form of a solenoid valve 133a equipped with a flame arrestor 133b;

4. oxidation chamber 52a (FIG. 2) in the form an oxidation chamber 152 including a cylindrical insulation blanket and a cylindrical thermal mass defining an oxidation fluid path with a spiral heating element 155 disposed within the oxidation fluid path;
5. retention chamber 53a (FIG. 2) in the form of a retention chamber 153 including a cylindrical insulation blanket and a cylindrical thermal mass 154b defining a retention fluid path;
6. heat dissipater 54a (FIG. 2) in the form of a heat dissipater 154;
7. a flash thermocouple 67 (FIG. 2) in the form of a flash thermocouple 167;
8. an oxidization thermocouple 68 (FIG. 2) in the form of an oxidization thermocouple 168; and
9. a vent thermocouple 69 (FIG. 2) in the form of a vent thermocouple 169.

Also shown in FIGS. 5A and 5B is a control box 160 as an embodiment of control box 60 (FIG. 3).

FIG. 6A provides a view of venturi air-gas mixer 151a.

FIG. 6B provides a view of a nozzle 151b of venturi air-gas mixer 151a, an interior wall of oxidization chamber 153, a heating element 155 helically disposed within interior wall of oxidization chamber 153 and an interior wall of retention chamber 154.

FIG. 6C provides a view of pleated heat exchanger 157 of heat dissipater 154 encircling a top portion of the interior wall of retention chamber 154.

Referring to FIG. 7, an embodiment 150b of thermal oxidizer 50a (FIG. 2) is a modification of thermal oxidizer 150a (FIG. 5A) involving a substitution of air blower 111 with a flashback preventer 111b.

Figure 8:
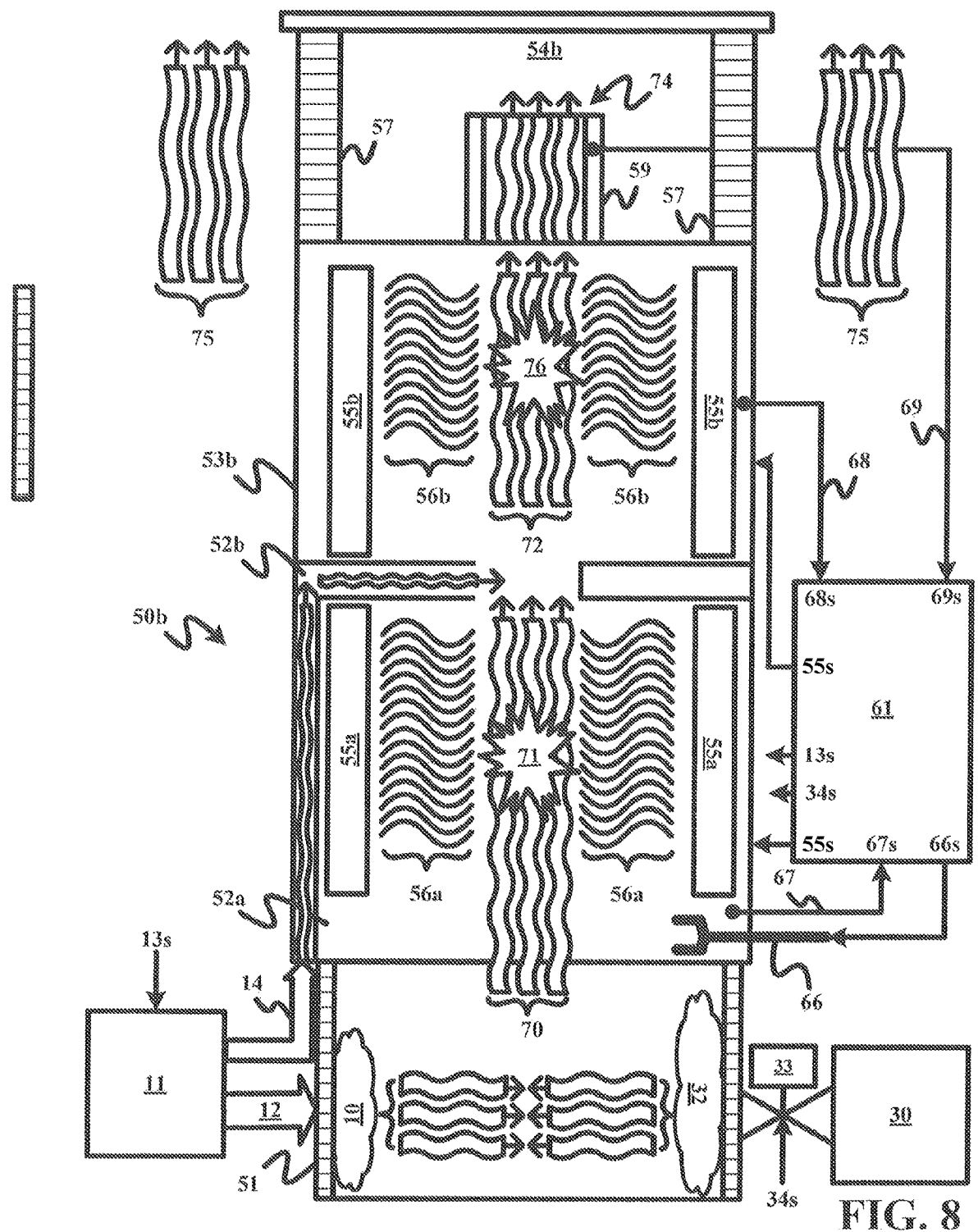
FIG. 8 illustrates a block diagram of a second exemplary embodiment of a thermal oxidization system in accordance with the inventive principles of the present disclosure.

To facilitate a further understanding of inventions of the present disclosure, the following description of FIG. 8 further teaches basic inventive principles of a thermal oxidization system and a thermal oxidization method of the present disclosure. From this description, those having ordinary skill in the art will appreciate how to apply the inventive principles of the present disclosure for making and using numerous and various embodiments of thermal oxidization systems and thermal oxidization methods of the present disclosure.

Referring to FIG. 8, a thermal oxidization system of the present disclosure incorporates a thermal oxidizer 50b employing oxidation mixer 51, an oxidation chamber 52a, a retention chamber 53b and a heat dissipater 54b forming a fluid flow path for an oxidation of a waste gas stream 32 (e.g., TRI gases) into oxidized combustion products 74 (e.g., oxidized gases 73 (FIG. 2) including $CO_2$, $H_2O$, $N_2$ and $O_2$).

As previously described, oxidation mixer 51 is structurally configured for mixing an oxidant 10 supplied by oxidant supply 11 (e.g., a blower or a pump) via a supply line 12 and a waste gas stream 32 (e.g., TRI gases) supplied by waste gas source 30 as controlled via a control flow conduit 33 (e.g., a solenoid valve and a flame arrestor in series coupling waste gas source 30 to oxidation mixer 51) into a combustible waste gas stream 70.

In one embodiment, oxidation mixer 51 is a venturi air-gas mixer whereby turbulent fluid flows of oxidant 10 and waste gas stream 32 into the venture air-gas mixer are controlled via oxidant supply 11 and control flow conduit 33 to ensure combustible waste gas stream 70 attains proportional concentrations of oxidant 10 and waste gas stream 32 within a flammable range (e.g., 11.5:1 oxidant 10 to waste gas stream 32). Additionally, oxidation mixer 51 may be equipped with a nozzle (not shown) for regulating a feeding of combustible waste gas stream 70 into oxidation chamber 52b whereby the nozzle may be structurally configured to generate more turbulence to combustible waste gas stream 70.

Oxidation chamber 52a is structurally configured for implementing a primary combustion reaction 71 therein of combustible waste gas stream 70 via a controlled emission of heat waves 56a by a heating element 55a. In one embodiment, oxidation chamber 52a is a refractory ceramic cylinder and heating element 55a is embedded within the walls of the refractory ceramic cylinder.

Optionally, oxidation chamber 52a may further employ a spark igniter 66 for a controlled ignition of combustible waste gas stream 70 at a proximal opening of oxidation chamber 52a. For this embodiment, if oxidization mixer 51 is equipped with a nozzle, then a distal tip of spark igniter 66 may be positioned within or adjacent to the flow of the combustible waste gas stream 70 out of the nozzle into oxidation chamber 52a.

Combustible waste gas stream 70a may fully or partially combust within oxidation chamber 52a. Oxidation chamber 52a therefore includes a supplement air inlet 52b for an additional flow of oxidant 10 via oxidant supply line 14 or via atmosphere to supplement the oxygenated waste gas stream 72 flowing into retention chamber 53b.

Retention chamber 53b is structurally configured for implementing a secondary combustion reaction 76 therein oxygenated waste gas stream 72 via a controlled omission of heat waves 56b by a heating element 55b. In one embodiment, retention chamber 53b is a refractory ceramic cylinder and heating element 55b is embedded within the walls of the refractory ceramic cylinder integrated with oxidation chamber 53b as shown. Retention chamber 53b ensures a complete oxidation of oxygenated waste gas stream 72 into heated oxidized combustion products 74 (e.g., oxidized gases 73 (FIG. 2) including $CO_2$, $H_2O$, $N_2$ and $O_2$).

Heat dissipater 54b is structurally configured for implementing a heat exchange with heated oxidized combustion products 74 to vent cooled oxidized combustion products 74 into the atmosphere. In one embodiment, heat dissipater 54b includes a nozzle 59 having a cylindrical shape whereby oxidized combustion products 74 exits heat dissipater 54b along a length and circumference of heat exchanger 57 with cooling atmosphere air 75 being directed vertically past heat exchanger 57 to thereby extract heat from heat exchanger 57.

The thermal oxidization system of FIG. 8 further incorporates a control system employing an oxidation controller 61, a data logger 63 (FIG. 3) and a data reporter 65 (FIG. 3) housed within a control box 60 (FIG. 3).

Oxidation controller 61 is structurally configured for controlling an operation of thermal oxidizer 50b in accordance with the thermal oxidization method of FIGS. 4A-4C as previously described herein. More particularly, heating elements 55a and 55b are controlled via a similar scheme as heating element 55 (FIG. 2).

In practice, oxidation controller 61 may be omitted whereby the heating elements 55 of thermal oxidizer 50a (FIG. 2) and thermal oxidizer 50b (FIG. 8) may be operated via an on/off switch.

Also in practice, oxidation controller 61 may implement a variation of the thermal oxidization method 90 (FIGS. 4A-4C) excluding the heat dissipater thermocouple 69 and involving the oxidation chamber thermocouple 67 and/or the retention chamber thermocouple 68. For such an embodiment, a one loop or a two loop proportional-integral-derivative ("PID") control may be implemented by oxidation controller 61 involving a zero crossover regulation of the heating element(s) 55 via heating regulation signal HR.

Figure 9:
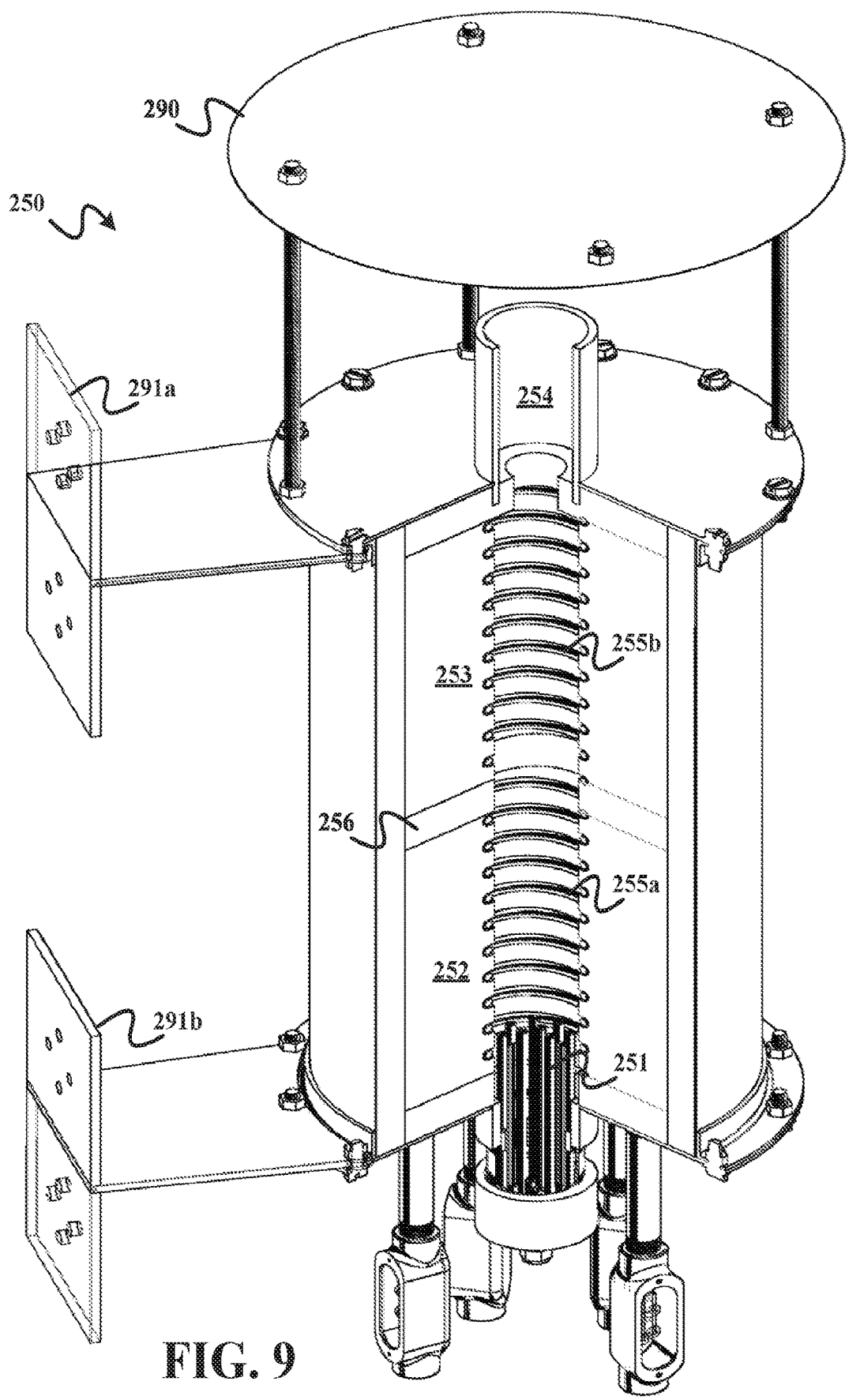
FIG. 9 illustrates a perspective view of an exemplary embodiment of the thermal oxidizer of FIG. 8 in accordance with the inventive principles of the present disclosure.

To facilitate a further understanding of the inventions of the present disclosure, the following description of FIGS. 9-10 teach a couple of embodiments of the thermal oxidation system of FIG. 8. From this description, those having ordinary skill in the art will appreciate how to apply the inventive principles of the present disclosure for making and using numerous and various additional embodiments of thermal oxidization systems of the present disclosure.

Referring to FIG. 9, an embodiment 250 of thermal oxidizer 50*b* (FIG. 8) employs:

1. an oxidation mixer nozzle 251 having an air inlet on a side wall and a bottom gas inlet;
2. oxidation chamber 52*a* (FIG. 8) in the form an oxidation chamber 252 including a cylindrical insolation blanket and a cylindrical thermal mass defining an oxidation fluid path with a spiral heating element 255*a* encircling the oxidation fluid path;
3. retention chamber 53*b* (FIG. 8) in the form of a retention chamber 253 including an insulation blanket and a thermal mass defining a retention fluid path with a spiral heating element 255*b* encircling the oxidation fluid path;
4. heat dissipater 54*b* (FIG. 10A) in the form of a heat dissipater 254 having a rain cap 290 (FIG. 9); and
5. mounting brackets 291*a* and 291*b*.

Thermocouples may or may not be incorporated dependent upon the control scheme.

Figure 10A:
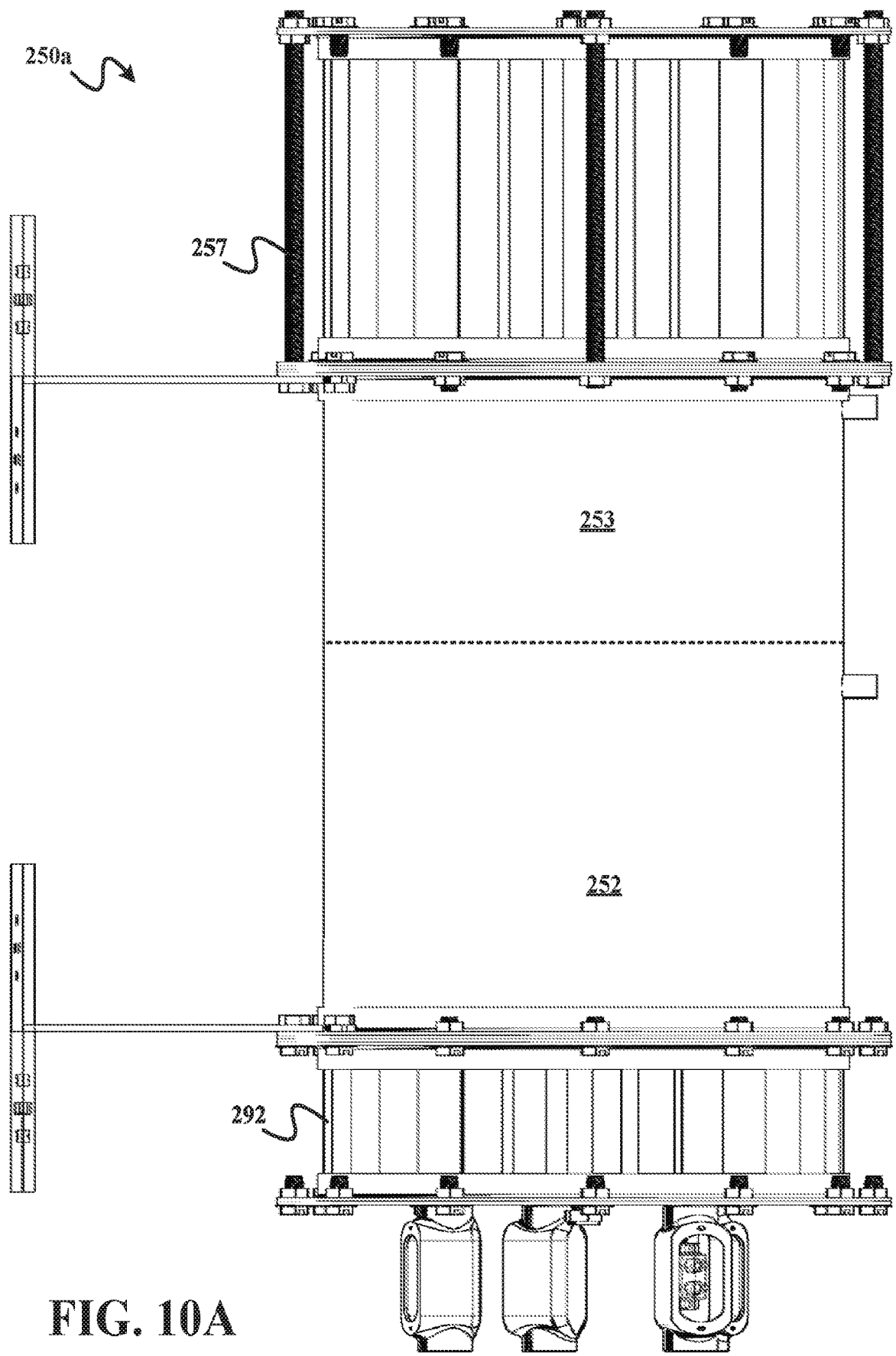
FIG. 10A illustrates an exemplary atmospheric embodiment of the thermal oxidizer of FIG. 9.

For example, FIG. 10A illustrates an atmospheric version 250*a* of thermal oxidizer 250 (FIG. 9) involving a non-force flow of atmospheric air into the thermal oxidizer 250*a* and an on/off control of the heating elements. A heat exchanger 257 provides for heat exchange and back flash protection of the heat dissipater, and a back flash 292 protects a back flash of the oxidation mixer.

Figure 10B:
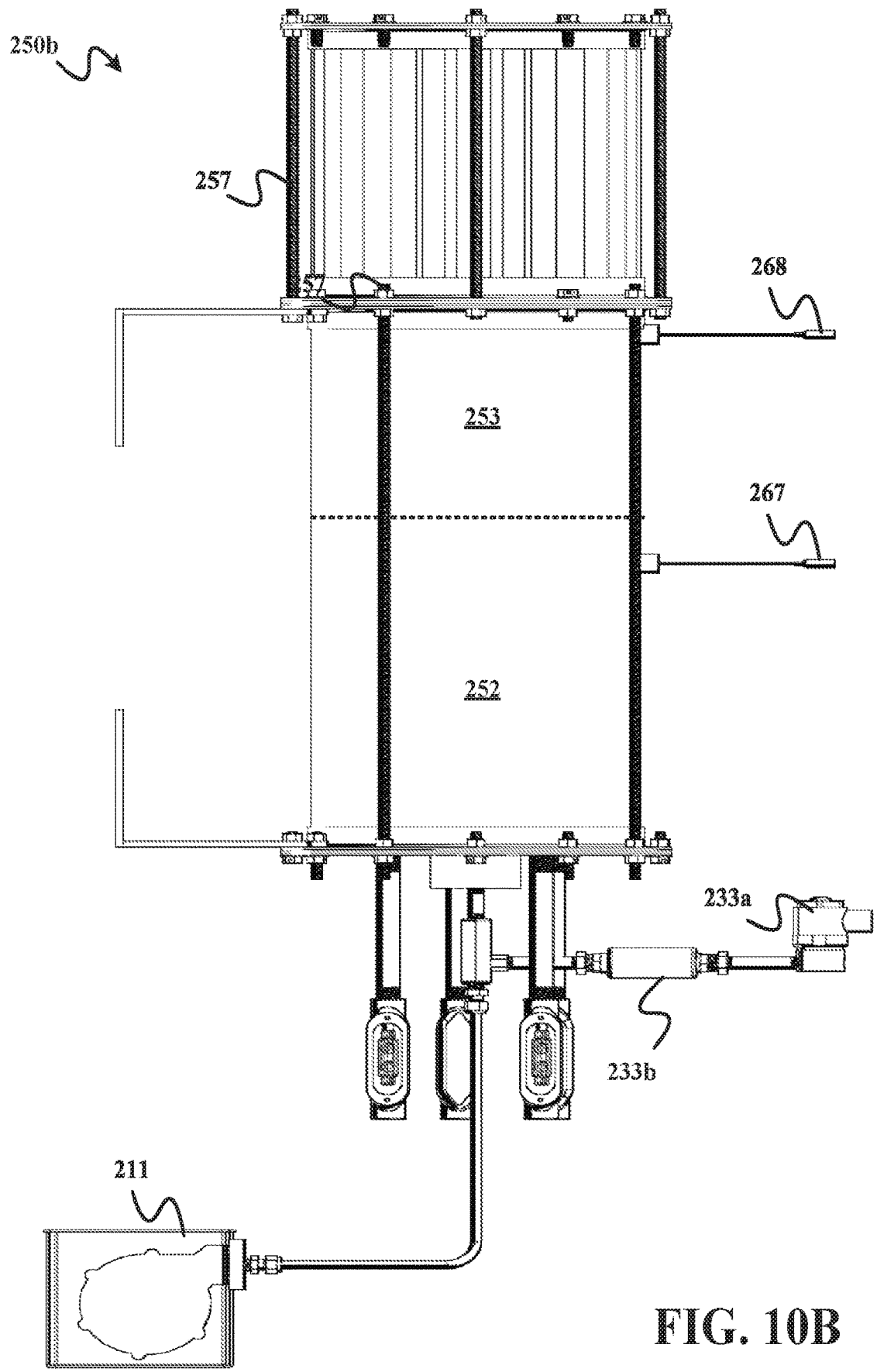
FIG. 10B illustrates an exemplary forced air embodiment of the thermal oxidizer of FIG. 9.

By further example, FIG. 10B illustrates a force-air version 250*b* of thermal oxidizer 250 (FIG. 9) incorporating an air blower 211, a solenoid valve 233*a*, a flash arrestor 233*b*, an oxidation thermocouple 267 and a retention thermocouple 268.

Referring to FIGS. 1-10, those having ordinary skill in the art of the present disclosure will appreciate various advantages of the inventions of the present disclosure including, but not limited to:

1. an active or passive control of an efficient thermal combustion of toxic release inventories gases ("TRI"), particularly in compliance with applicable environment regulations; and
2. data logging and data reporting of the active control of the thermal combustion of TRI.

While various embodiments of the present invention have been illustrated and described, it will be understood by those skilled in the art that the methods and the system as described herein are illustrative, and various changes and modifications may be made and equivalents may be substituted for elements thereof without departing from the true scope of the present invention. In addition, many modifications may be made to adapt the teachings of the present invention without departing from its central scope. Therefore, it is intended that the present invention not be limited to the particular embodiments disclosed as the best mode contemplated for carrying out the present invention, but that the present invention include all embodiments falling within the scope of the appended claims.

The invention claimed is:

1. A thermal oxidizer (50), comprising:
    an oxidation mixer (51), an oxidation chamber (52), a retention chamber (53) and a heat dissipater (54) forming a fluid flow path for a thermal oxidation of a waste gas,
        wherein the oxidation mixer (51) is structurally configured to facilitate a combustible mixture of a waste gas stream and an oxidant within the oxidation mixer into a combustible waste gas stream flowing within the oxidation mixer;
        wherein the oxidation chamber (52) is in fluid communication with the oxidation mixer (51) to receive a flow of the combustible waste gas stream;
        wherein the oxidation chamber (52) includes a primary heating element (55) to facilitate a primary combustion reaction of the combustible waste gas stream into an oxygenated waste gas stream within the oxidation chamber (52);
        wherein the oxidation chamber (52) further includes a supplemental air inlet structurally configured to facilitate a combustible mixture of an additional oxidant and the oxygenated waste gas stream into a combustible oxygenated waste gas stream flowing in the retention chamber (53), wherein the supplemental air inlet is configured to dispense the additional oxidant between the oxidation chamber and the retention chamber;
        wherein the retention chamber (53) is in fluid communication with the oxidation chamber (52) to receive a flow of the oxygenated waste gas stream;
        wherein the retention chamber (53) is structurally configured to facilitate a secondary combustion reaction of the oxygenated waste gas stream into oxidized gases within the retention chamber (53);
        wherein the heat dissipater (54) is in fluid communication with the retention chamber (53) to receive a flow of the oxidized gases; and
        wherein the heat dissipater (54) is structurally configured to facilitate an atmospheric venting of the oxidized gases.
2. The thermal oxidizer (50) of claim 1, further comprising:
    a thermocouple (67) in thermal communication with the oxidation chamber (52) to measure a temperature of the oxidation chamber (52).
3. The thermal oxidizer (50) of claim 1, further comprising:
    a thermocouple (68) in thermal communication with the retention chamber (53) to measure a temperature of the retention chamber (53).
4. The thermal oxidizer (50) of claim 1, further comprising:
    a thermocouple (69) in thermal communication with the heat dissipater (54) to measure a temperature of the heat dissipater (54).
5. The thermal oxidizer (50) of claim 1, further comprising at least one of:
    a solenoid valve operable for regulating a feed of the waste gas stream into the oxidation mixer (51); and
    an oxidant supply operable for regulating a feed of the oxidant into the oxidation mixer (51).
6. The thermal oxidizer (50) of claim 1, wherein the retention chamber (53) includes:

a secondary heating element (55) operable to facilitate a secondary combustion reaction of the oxygenated waste gas stream into oxidized gases within the retention chamber (53).

7. A thermal oxidization system, comprising:

a thermal oxidizer (50) including an oxidation mixer (51), an oxidation chamber (52), a retention chamber (53) and a heat dissipater (54) forming a fluid flow path for a thermal oxidation of a waste gas,
  wherein the oxidation mixer (51) is structurally configured to facilitate a combustible mixture of a waste gas stream and an oxidant within the oxidation mixer into a combustible waste gas stream;
  wherein the oxidation chamber (52) is in fluid communication with the oxidation mixer (51) to receive a flow of the combustible waste gas stream;
  wherein the oxidation chamber (52) includes a primary heating element (55) to facilitate a primary combustion reaction of the combustible waste gas stream into an oxygenated waste gas stream within the oxidation chamber (52);
  wherein the retention chamber (53) is in fluid communication with the oxidation chamber (52) to receive a flow of the oxygenated waste gas stream;
  wherein the retention chamber (53) is structurally configured to facilitate a secondary combustion reaction of the oxygenated waste gas stream into oxidized gases within the retention chamber (53);
  wherein the heat dissipater (54) is in fluid communication with the retention chamber (53) to receive a flow of the oxidized gases; and
  wherein the heat dissipater (54) is structurally configured to facilitate an atmospheric venting of the oxidized gases, and an oxidation controller (61) structurally configured to regulate an operation of the thermal oxidizer (50) including regulating the atmospheric venting of the oxidized gases by the heat dissipater (54) and at least one of:
  regulating the combustible mixture of the waste gas stream and the oxidant into the combustible waste gas stream within the oxidation mixer (51),
  regulating the primary combustion reaction of the combustible waste gas stream into an oxygenated waste gas stream within the oxidation chamber (52), and
  regulating the secondary combustion reaction of the oxygenated waste gas stream into the oxidized gases within the retention chamber (53).

8. The thermal oxidization system of claim 7, further comprising:
  a thermocouple (67) in thermal communication with the oxidation chamber (52) to measure a temperature of the oxidation chamber (52); and
  wherein, responsive to a measurement of the temperature of the oxidation chamber (52) by the thermocouple (67), the oxidation controller (61) is structurally configured to monitor the temperature of the oxidation chamber (52) relative to at least one regulation threshold representative of a controlled operation of the thermal oxidizer (50).

9. The thermal oxidization system of claim 7, further comprising:
  a thermocouple (68) in thermal communication with the retention chamber (53) to measure a temperature of the retention chamber (53); and
  wherein, responsive to a measurement of the temperature of the retention chamber (53) by the thermocouple (68), the oxidation controller (61) is structurally configured to monitor the temperature of the retention chamber (53) relative to at least one regulation threshold representative of a controlled operation of the thermal oxidizer (50).

10. The thermal oxidization system of claim 7, further comprising:
  a thermocouple (69) in thermal communication with the heat dissipater (54) to measure a temperature of the heat dissipater (54); and
  wherein, responsive to a measurement of the temperature of the heat dissipater (54) by the thermocouple (69), the oxidation controller (61) is structurally configured to monitor the temperature of the heat dissipater (54) relative to at least one regulation threshold representative of a controlled operation of the thermal oxidizer (50).

11. The thermal oxidization system of claim 7, further comprising at least one of:
  a solenoid valve operable for regulating a feed of the waste gas stream into the oxidation mixer (51); and
  an oxidant supply operable for regulating a feed of the oxidant into the oxidation mixer (51).

12. The thermal oxidization system of claim 7, wherein the retention chamber (53) includes:
  a secondary heating element (55) operable to facilitate a secondary combustion reaction of the oxygenated waste gas stream into oxidized gases within the retention chamber (53).

13. The thermal oxidization system of claim 7, wherein the oxidation chamber (52) further includes:
  a supplemental air inlet structurally configured to facilitate a combustible mixture of an additional oxidant and the oxygenated waste gas stream into a combustible oxygenated waste gas stream flowing in the retention chamber (53).

14. The thermal oxidization system of claim 7, further comprising at least one of:
  a data logger (63) structurally configured to log a regulation of the thermal oxidizer (50) by the oxidation controller (61); and
  a data reporter (65) structurally configured to remotely report the regulation of the thermal oxidizer (50) by the oxidation controller (61).

* * * * *